United States Patent
Kihara et al.

(10) Patent No.: US 7,857,874 B2
(45) Date of Patent: Dec. 28, 2010

(54) MICRO-REACTOR AND METHOD OF MANUFACTURING THE SAME

(75) Inventors: Takeshi Kihara, Shinjuku-ku (JP); Hiroshi Yagi, Shinjuku-ku (JP); Koichi Suzuki, Shinjuku-ku (JP); Yoshiaki Ogiwara, Chiyoda-ku (JP); Junji Ninomiya, Chiyoda-ku (JP); Kazunori Ishikawa, Chiyoda-ku (JP)

(73) Assignees: Dai Nippon Printing Co., Ltd., Tokyo (JP); The Furukawa Electric Co., Ltd., Tokyo (JP); Furukawa-Sky Aluminum Corp., Tokyo (JP)

( * ) Notice: Subject to any disclaimer, the term of this patent is extended or adjusted under 35 U.S.C. 154(b) by 669 days.

(21) Appl. No.: 10/589,853

(22) PCT Filed: Feb. 25, 2005

(86) PCT No.: PCT/JP2005/003676

§ 371 (c)(1),
(2), (4) Date: Aug. 17, 2006

(87) PCT Pub. No.: WO2005/082777

PCT Pub. Date: Sep. 9, 2005

(65) Prior Publication Data

US 2007/0163175 A1 Jul. 19, 2007

(30) Foreign Application Priority Data

Mar. 1, 2004 (JP) .............................. 2004-055922

(51) Int. Cl.
*H01M 8/06* (2006.01)
*B21D 51/16* (2006.01)

(52) U.S. Cl. .......................... 48/127.9; 48/61; 48/118.5; 422/130

(58) Field of Classification Search .................... 48/61; 29/890
See application file for complete search history.

(56) References Cited

U.S. PATENT DOCUMENTS

| | | | |
|---|---|---|---|
| 2003/0105172 A1* | 6/2003 | Bowe et al. | 518/728 |
| 2004/0025784 A1* | 2/2004 | Kawamura et al. | 117/200 |
| 2004/0148859 A1* | 8/2004 | Kawamura et al. | 48/127.9 |
| 2004/0258587 A1* | 12/2004 | Bowe et al. | 422/222 |
| 2006/0051260 A1* | 3/2006 | Yagi et al. | 422/198 |

FOREIGN PATENT DOCUMENTS

| | | |
|---|---|---|
| JP | 3 196839 | 8/1991 |
| JP | 5 15778 | 1/1993 |
| JP | 2003 507288 | 2/2003 |
| JP | 2003 168685 | 6/2003 |
| JP | 2003 265949 | 9/2003 |
| JP | 2004 188258 | 7/2004 |
| JP | 2004 290873 | 10/2004 |
| WO | WO 2004069738 A1 * | 8/2004 |

* cited by examiner

*Primary Examiner*—Alexa D Neckel
*Assistant Examiner*—Imran Akram
(74) *Attorney, Agent, or Firm*—Oblon, Spivak, McClelland, Maier & Neustadt, L.L.P.

(57) ABSTRACT

A structure of a microreactor includes a joined body having a pair of substrates joined together, a flow path formed by a microchannel portion formed on a joining surface of at least one of the substrates, and a catalyst carrying member disposed in the flow path. In the production of such a microreactor, the catalyst carrying member is produced separately from formation of the joined body and the catalyst carrying member is disposed in the flow path at the time of forming the joined body.

13 Claims, 13 Drawing Sheets

MICRO-REACTOR AND METHOD OF MANUFACTURING THE SAME

TECHNICAL FIELD

The present invention relates to a microreactor and particularly a microreactor for allowing desired reactions to proceed by the use of a supported catalyst, and a production method of such a microreactor.

BACKGROUND ART

Hitherto, reactors employing catalysts have been used in various fields and optimally designed depending on the purpose.

On the other hand, in recent years, attention has been paid to using hydrogen as fuel because of no generation of global warming gas such as carbon dioxide in terms of the global environmental protection, and of the high energy efficiency. Particularly, attention has been paid to fuel cells because they can directly convert hydrogen to electric power and enable the high energy conversion efficiency in the cogeneration system utilizing generated heat. The fuel cells have been hitherto employed under the particular conditions such as in the space development and the ocean development. Recently, however, the development has advanced toward using them for automobile and household distributed power supplies, and fuel cells for portable devices have also been developed.

With respect to the fuel cells for portable devices, reduction in size is essential so that reduction in size of reformers that produce hydrogen gas by steam reforming hydrocarbon-based fuel has been studied variously. For example, there has been developed a microreactor having a silicon substrate or a ceramic substrate formed with a microchannel and carrying a catalyst in this microchannel (Laid-open Unexamined Patent Publication No. 2002-252014).

However, since the conventional microreactor, including the microreactor for hydrogen production, carries the catalyst in the microchannel, it is necessary to select a material of the microreactor taking into account catalyst supportability thereof and therefore there have been those instances where there is no alternative but to use a material that is poor in heat utilization efficiency. Further, there has been a problem that, in the process of applying a catalyst into a microchannel, cleanness of a substrate surface where the microchannel is formed is lost to thereby impede the microreactor production which is implemented by joining substrates together. Further, there have been those instances where a catalyst supported in a microchannel is extremely contaminated or deactivated in a later process and therefore there has also been a problem that usable catalysts are limited and the production process management is difficult. Moreover, the conventional microreactor has a low reaction efficiency and therefore a microreactor with a higher reaction efficiency has been demanded.

DISCLOSURE OF THE INVENTION

The present invention has been made in terms of the foregoing circumstances and has an object to provide a microreactor that is small and enables a highly efficient catalytic reaction, and a production method that can easily produce such a microreactor.

For accomplishing such an object, it is configured such that a microreactor of the present invention comprises a joined body having a pair of substrates joined together, a flow path formed by a microchannel portion formed on a joining surface of at least one of said substrates, and a catalyst carrying member disposed in said flow path.

As another mode of the present invention, it is configured such that said catalyst carrying member comprises a metal base body, a metal oxide film covering said metal base body, and a catalyst supported on said metal oxide film.

As another mode of the present invention, it is configured such that said metal oxide film is formed by anodic oxidation of said metal base body or that said metal oxide film is formed by a boehmite treatment.

As another mode of the present invention, it is configured such that said joined body is provided with a heater at least one of said substrates and that said heater is provided on said substrate via an insulating layer.

As another mode of the present invention, it is configured such that said catalyst carrying member comprises an electric heater, a metal oxide film covering said electric heater, and a catalyst supported on said metal oxide film.

As another mode of the present invention, it is configured such that said metal oxide film is formed by a boehmite treatment.

As another mode of the present invention, it is configured such that said catalyst carrying member comprises an electric heater, a metal film covering said electric heater, a metal oxide film covering said metal film, and a catalyst supported on said metal oxide film.

As another mode of the present invention, it is configured such that said metal oxide film is formed by anodic oxidation of said metal film or that said metal oxide film is formed by a boehmite treatment.

According to the present invention as described above, the catalyst carrying member is disposed in the flow path and the catalyst is not directly supported on the substrate wall surface (flow path wall surface), so that it is possible to select the substrates without considering the catalyst supportability thereof. For example, those substrates having a high thermal conductivity can be used to increase thermal conduction from a heat source, thereby improving the reaction efficiency. Alternatively, those substrates having a low thermal conductivity can be used to prevent radiation of heat within the flow path, thereby improving the heat utilization efficiency. Further, when the catalyst carrying member has the electric heater, the catalyst can be heated to a proper temperature in a moment to thereby enable a microreactor where the rising speed upon starting up from the stopped state is high and the utilization efficiency of the input power is high.

It is configured such that a production method of a microreactor of the present invention comprises a channel forming step of forming a microchannel portion on one surface of at least one of a pair of substrates for forming a joined body, a catalyst applying step of forming a catalyst carrying member carrying a catalyst on the surface thereof, and a joining step of disposing said catalyst carrying member in said microchannel portion and joining together said pair of substrates so as to confront each other, thereby forming the joined body having a flow path formed by said microchannel portion and having said catalyst carrying member in said flow path.

Further, it is configured such that a production method of a microreactor of the present invention comprises a channel forming step of forming a plurality of microchannel portions on one surface of at least one of a pair of substrates for forming a joined body, a catalyst applying step of forming catalyst carrying members each carrying a catalyst on the surface thereof, a first joining step of disposing said catalyst carrying members in said microchannel portions and joining together said pair of substrates so as to confront each other, thereby forming the joined body having a plurality of flow paths formed by said plurality of microchannel portions, having said catalyst carrying member in each flow path, and having two end surfaces where both end opening portions of each flow path are exposed, respectively, and a second joining step of joining terminating members comprising turnback flow paths to said two end surfaces where the opening portions of the flow paths of said joined body are exposed, thereby forming a single continuous flow path.

As another mode of the present invention, it is configured such that said catalyst applying step forms a metal oxide film on the surface of a metal base body and applies the catalyst on said metal oxide film, thereby forming said catalyst carrying member.

As another mode of the present invention, it is configured such that said metal oxide film is formed by anodic oxidation of said metal base body or that said metal oxide film is formed by a boehmite treatment.

As another mode of the present invention, it is configured such that said catalyst applying step covers an electric heater with a metal oxide film and applies the catalyst on said metal oxide film, thereby forming said catalyst carrying member.

As another mode of the present invention, it is configured such that said metal oxide film is formed by a boehmite treatment.

As another mode of the present invention, it is configured such that said catalyst applying step covers an electric heater with a metal film, further covers said metal film with a metal oxide film, and applies the catalyst on said metal oxide film, thereby forming said catalyst carrying member.

As another mode of the present invention, it is configured such that said metal oxide film is formed by anodic oxidation of said metal film or that said metal oxide film is formed by a boehmite treatment.

According to the present invention as described above, since the catalyst is not directly applied in the microchannel portion of the substrate and the catalyst carrying member is produced independently of the formation of the microchannel portion on the substrate, variation in catalyst applying amount is suppressed to enable uniform catalyst applying. Further, occurrence of contamination and deactivation of the catalyst is prevented, cleanness of the surfaces of the substrates is not lost and therefore reliability of joining between the substrates is enhanced, and the difficult production process management becomes unnecessary.

BEST MODE FOR CARRYING OUT THE INVENTION

Hereinbelow, embodiments of the present invention will be described with reference to the drawings.

Microreactor

First Embodiment

Figure 1:
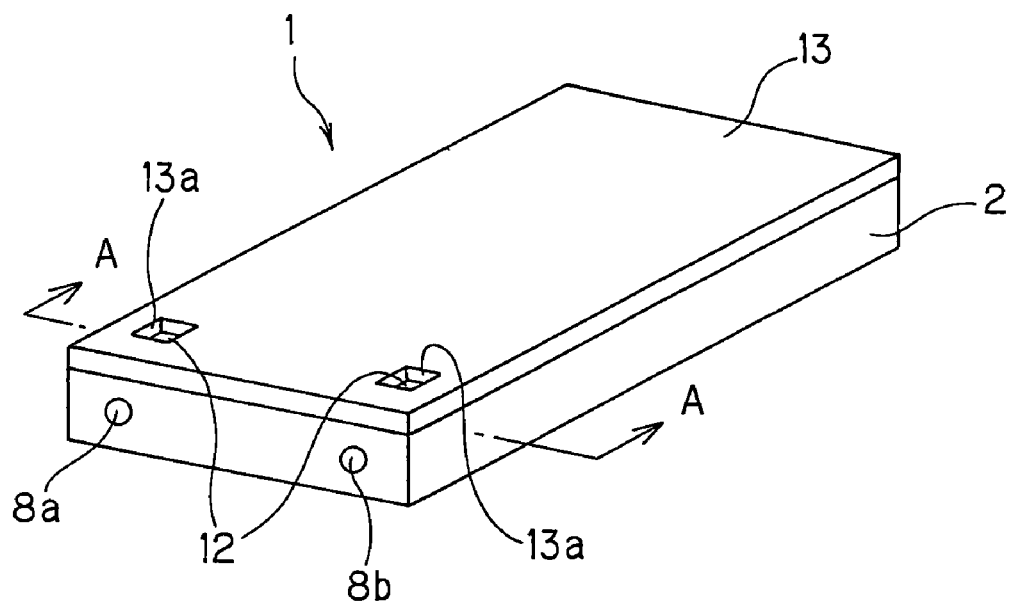
FIG. 1 is a perspective view-showing one embodiment of a microreactor of the present invention.
Figure 2:
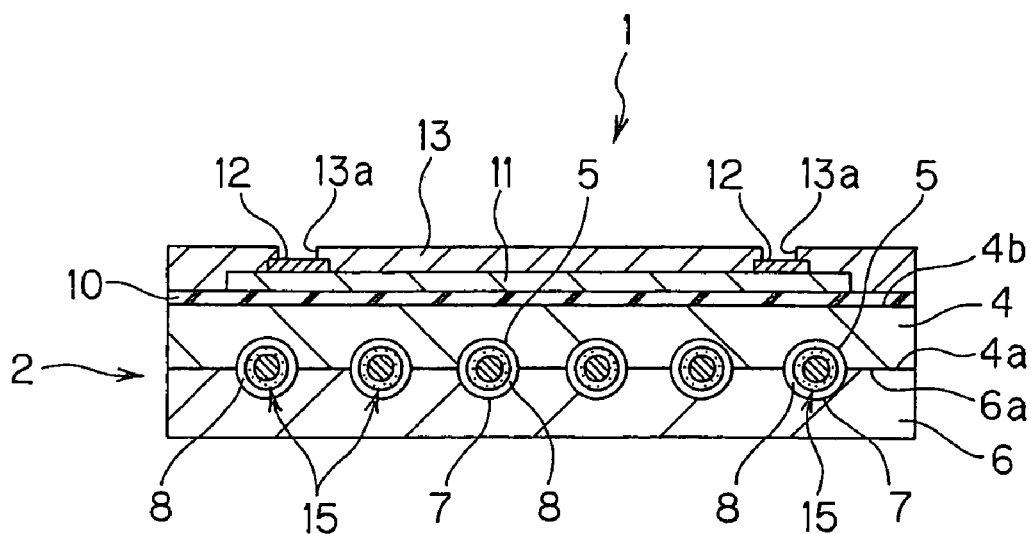
FIG. 2 is an enlarged longitudinal sectional view of the microreactor shown in FIG. 1, taken along line A-A.

FIG. 1 is a perspective view showing one embodiment of a microreactor of the present invention, and FIG. 2 is an enlarged longitudinal sectional view of the microreactor shown in FIG. 1, taken along line A-A. In FIGS. 1 and 2, the microreactor 1 of the present invention comprises a joined body 2 in which a substrate 4 formed with a microchannel portion 5 on one surface 4a thereof, and a substrate 6 formed with a microchannel portion 7 on one surface 6a thereof are joined together such that the microchannel portion 5 and the microchannel portion 7 confront each other. Inside the joined body 2, there is formed a flow path 8 composed of the confronting microchannel portions 5 and 7, and a catalyst carrying member 15 is disposed inside the flow path 8. Further, both end openings of the flow path 8 are exposed at one end surface of the foregoing joined body 2 to form a feed material inlet 8a and a product recovery port 8b, respectively. Further, a heater 11 is provided on a surface 4b of the substrate 4 via an insulating layer 10. The heater 11 is formed with electrodes 12 and 12, and a heater protective layer 13 having electrode opening portions 13a and 13a for exposing the electrodes 12 and 12 is provided so as to cover the heater 11.

Figure 3:
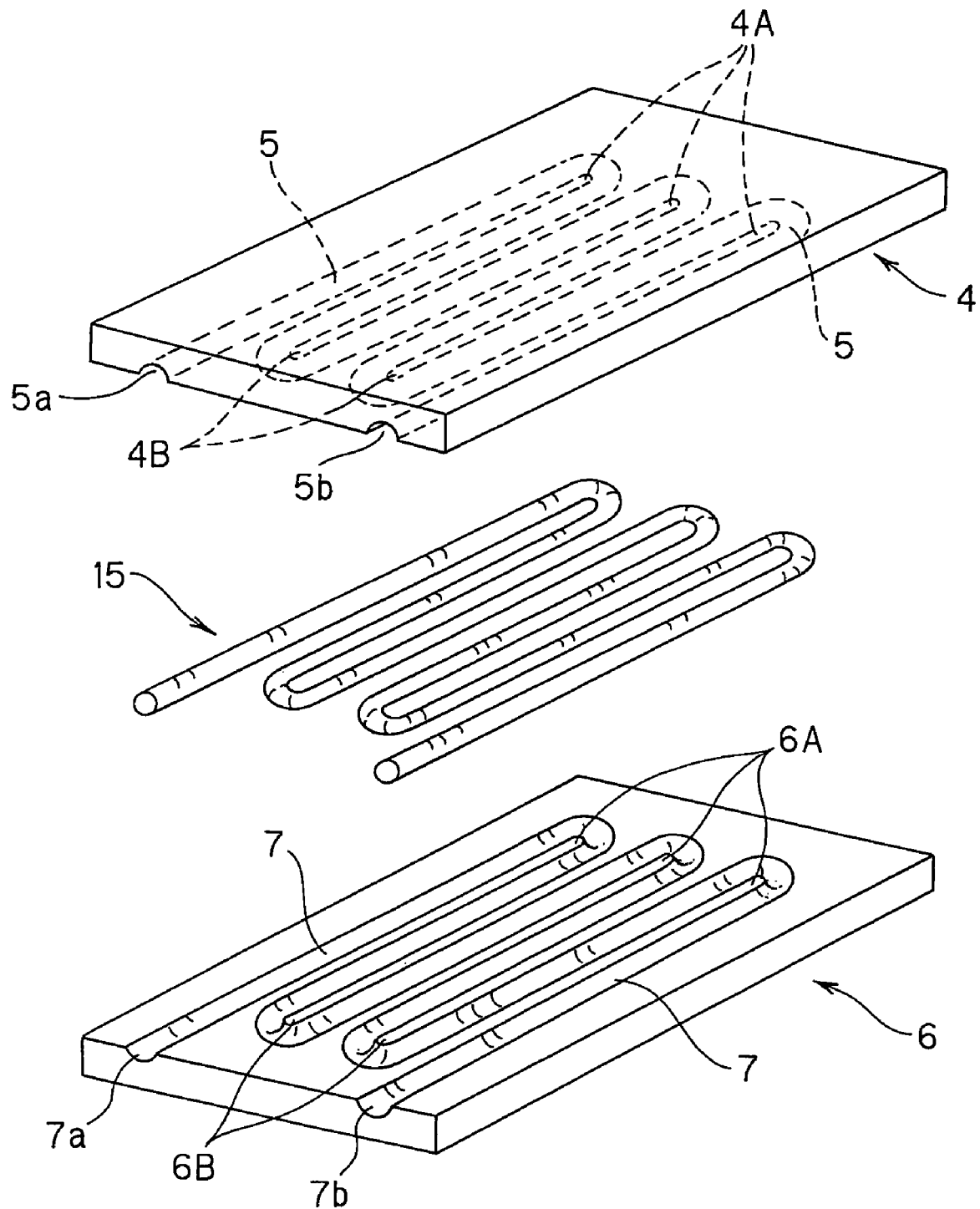
FIG. 3 is a perspective view showing the state where substrates forming a joined body of the microreactor shown in FIG. 1 are separated from each other and a catalyst carrying member is taken out.

FIG. 3 is a perspective view showing the state where the substrate 4 and the substrate 6 forming the joined body 2 of the microreactor 1 shown in FIG. 1 are separated from each other and the catalyst carrying member 15 disposed in the flow path 8 is taken out. As shown in FIG. 3, the microchannel portion 5 is formed so as to turn back by 180 degrees at respective tip portions of comb-shaped ribs 4A and 4B and has a shape that is continuous from an end portion 5a to an end portion 5b while meandering. The microchannel portion 7 is also formed so as to turn back by 180 degrees at respective tip portions of comb-shaped ribs 6A and 6B and has a shape that is continuous from an end portion 7a to an end portion 7b while meandering. Further, the microchannel portion 5 and the microchannel portion 7 have pattern shapes that are in a symmetrical relationship with respect to a joining plane between the substrates 4 and 6.

Figure 4:
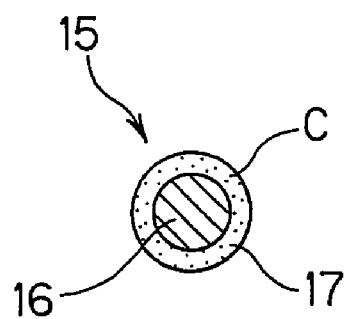
FIG. 4 is a longitudinal sectional view of the catalyst carrying member forming the microreactor shown in FIG. 1.

The catalyst carrying member 15 is a single member that meanders corresponding to the meandering shapes of the foregoing microchannel portions 5 and 7 and, as shown in FIG. 4, its sectional structure is such that a metal oxide film 17 is provided so as to cover a metal base body 16 and a catalyst C is supported on this metal oxide film 17.

The joined body 2 is formed by joining together the foregoing substrates 4 and 6 with the catalyst carrying member 15 located in the microchannel portions 5 and 7, wherein the end portion 5a of the microchannel portion 5 is located on the end portion 7a of the microchannel portion 7 and the end portion 5b of the microchannel portion 5 is located on the end portion 7b of the microchannel portion 7 so that the microchannel portion 5 and the microchannel portion 7 completely confront each other to thereby form the flow path 8. The shape of an inner wall surface of the flow path 8 formed by such microchannel portions 5 and 7 and having the catalyst carrying member 15 disposed inside is generally circular in a section perpendicular to a fluid flow direction of the flow path 8. Further, the turnback of the flow path 8 at each of the tip portions of the comb-shaped ribs 4A and 4B or the comb-shaped ribs 6A and 6B is rounded with no angular portion. The end portion 5a of the microchannel portion 5 and the end portion 7a of the microchannel portion 7 form the feed material inlet 8a, while the end portion 5b of the microchannel portion 5 and the end portion 7b of the microchannel portion 7 form the product recovery port 8b.

There is no particular limitation to a material of the substrates 4 and 6 forming the microreactor 1 as long as it does not cause a hindrance to reactions in the flow path 8, and selection can be suitably made from materials such as metal, silicon, and ceramics. In the present invention, since the catalyst is not directly supported on the wall surface of the flow path 8, it is possible to select a material of the substrates 4 and 6 without giving consideration to its catalyst supportability.

As a metallic material for the substrates 4 and 6, there is no particular limitation thereto as long as it does not cause a hindrance to reactions in the flow path 8. For example, use can be made of a metal that can form a metal oxide film (insulating layer 10) by anodic oxidation. As such a metal, there can be cited, for example, Al, Si, Ta, Nb, V, Bi, Y, W, Mo, Zr, Hf, or the like. Among these metals, particularly Al is preferably used in terms of processing suitability, properties such as a heat capacity and a thermal conductivity, and a unit price. On the other hand, as a ceramic material, there can be cited $Al_2O_3$, $Si_3N_4$, SiC, AlN, $ZrO_2$, or the like.

The thickness of the substrate 4, 6 can be suitably set taking into account the size of the microreactor 1, properties such as a heat capacity and a thermal conductivity of a substrate material to be used, the size of the microchannel portion 5, 7 to be formed, and so on. For example, it can be set within a range of about 100 μm to 2 mm.

The microchannel portions 5 and 7 formed on the metal substrates 4 and 6 are not limited to the shapes of the illustrated example as long as they can form the flow path 8 in the state where the catalyst carrying member 15, as will be described later, is disposed therein. In the illustrated example, at each position where the direction of the flow path 8 changes, the microchannel portion 5, 7 is formed such that the flow path direction smoothly changes in a U-shape. However, there may exist a portion where the internal wall surface is angularly bent (e.g. ]-shaped portion). Further, the shape of the inner wall surface of the microchannel portion 4, 6 in the section perpendicular to the fluid flow direction may be a circular arc shape, a semicircular shape, or a U-shape, and can be suitably set to a V-shape, a ]-shape, or the like corresponding to the shape of the catalyst carrying member 15 disposed inside the flow path 8, or the like. The depth and width of such a microchannel portion 4, 6 can be set taking into account a use of the microreactor 1, the shape and size of the catalyst carrying member 15, and so on. For example, the depth can be set within a range of about 200 to 800 μm and the width can be set within a range of about 200 μm to 10 mm. Further, the length of the flow path 8 can also be set in consideration of a use of the microreactor 1, and so on and can be within a range of, for example, 80 to 320 mm.

As described above, the catalyst carrying member 15 constituting the microreactor 1 is formed such that the metal oxide film 17 is provided so as to cover the metal base body 16 and the catalyst C is carried by this metal oxide film 17.

As the metal base body 16, use can be made of, for example, a metal that can form the metal oxide film 17 by anodic oxidation. As such a metal, there can be cited, for example, Al, Si, Ta, Nb, V, Bi, Y, W, Mo, Zr, Hf, or the like. Further, as the metal base body 16, use can also be made of a material that can form the metal oxide film 17 through a boehmite treatment, for example, Cu, stainless, Fe, Al, or the like. Although the metal base body 16 has a continuous wire shape being circular in section in the illustrated example, there is no particular limitation to the sectional shape thereof. The thickness of the metal base body 16 can be suitably set taking into account a use of the microreactor 1, the thickness and length of the flow path 8, easiness of material flow within the flow path 8, and so on and can be set within a range of, for example, about 100 to 800 μm.

The metal oxide film 17 is provided for carrying the catalyst C and may be formed by the anodic oxidation of the metal base body 16 or the boehmite treatment thereof as described above. Such a metal oxide film 17 has microholes and thus enables a large carrying amount of the catalyst C and stable catalyst applying.

The formation of the metal oxide film 17 by the anodic oxidation on the metal base body 16 can be implemented by, in the state where the metal base body 16 is connected to an anode of external electrodes, immersing the metal base body 16 in an anode oxidizing solution so as to confront a cathode thereof and energizing it. The thickness of the metal oxide film 17 can be set within a range of, for example, about 10 to 100 μm.

On the other hand, the formation of the metal oxide film 17 by the boehmite treatment can be implemented by, for example, using a suspension with boehmite alumina being dispersed therein, such as alumina sol, and applying the suspension with a fully lowered viscosity to the metal base body 16 (or immersing the metal base body 16 therein), thereafter, drying it to fix a boehmite coating on the surface of the metal base body 16. The metal oxide film 17 formed by such a boehmite treatment is an aluminum oxide thin film and the thickness thereof can be set within a range of, for example, about 0.1 to 10 μm.

The catalyst C supported on the metal oxide film 17 can be suitably selected depending on a use of the microreactor 1 and there is no particular limitation thereto.

Figure 5:
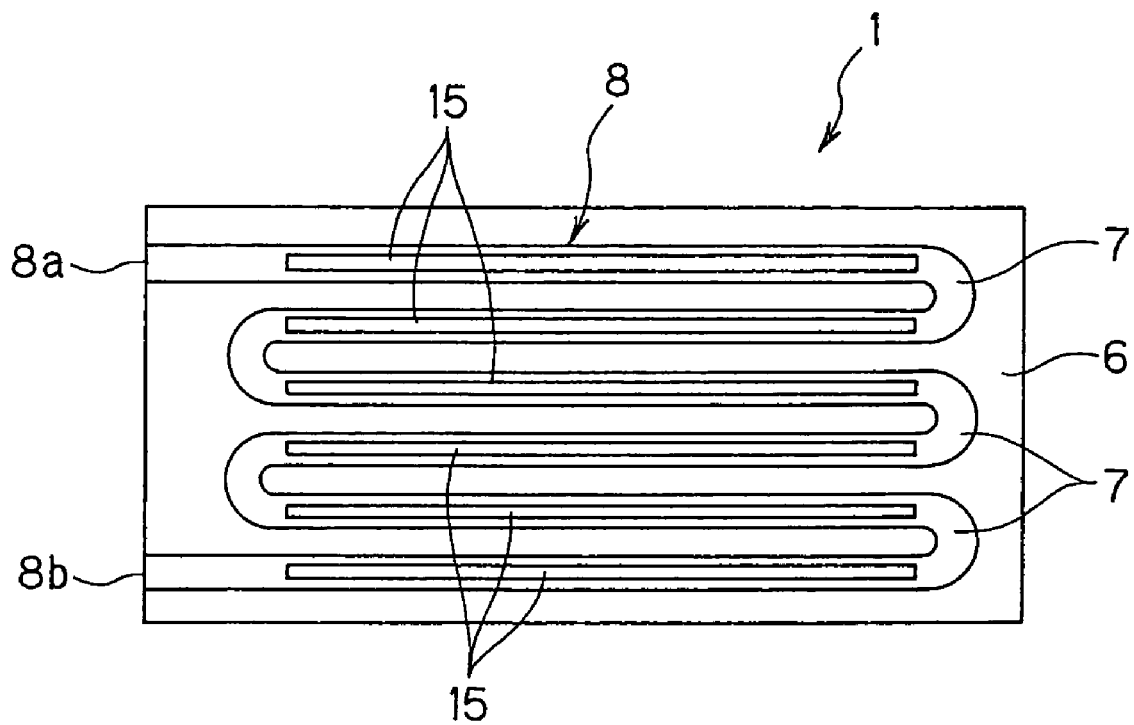
FIG. 5 is a plan view of a substrate showing another embodiment of a microreactor of the present invention.

The shape of the catalyst carrying member 15 is the single meandering shape in the illustrated example, but is not limited thereto. For example, as shown in FIG. 5, each of catalyst carrying members 15 may be formed into a linear shape having a predetermined length and the catalyst carrying members 15 may be disposed at respective linear portions in the meandering flow path 8 (only the microchannel portion 7 of the substrate 6 is shown in the figure).

The insulating layer 10 formed on the surface 4b of the substrate 4 is for ensuring electrical insulation between the substrate 4 and the heater 11 when the substrate 4 is made of a metallic material (material having conductivity). When the substrate 4 is anodically oxidizable, the insulating layer 10 may be made of a metal oxide formed by anodic oxidation or may be formed by, for example, an electrically insulating material such as polyimide or ceramic ($Al_2O_3$, $SiO_2$). The thickness of such an insulating layer 10 can be suitably set taking into account properties of a material to be used and so on. For example, it can be set within a range of about 0.1 to 2 μm. The insulating layer 10 may be present at least between the joined body 2 and the heater 11 and thus may also be formed on other surfaces of the joined body 2, and further, may be formed over the whole region on the periphery of the joined body 2. When the substrate 4 is made of an electrically insulating material, it is not necessary to provide the insulating layer 10.

The heater 11 forming the microreactor 1 is for supplying heat required for reactions in the flow path 8 and it is possible to use therefor an electric heating material such as carbon paste, nichrome (Ni—Cr alloy), W (tungsten), or Mo (molybdenum). The heater 11 can have a shape like one that is obtained by, for example, drawing around a fine line having a width of about 10 to 200 μm over the whole of a region on the substrate surface 4b (insulating layer 10) corresponding to a region where the microchannel portion 5 is formed.

Such a heater 11 is formed with the energization electrodes 12 and 12. The energization electrodes 12 and 12 can be formed using a conductive material such as Au, Ag, Pd, or Pd—Ag.

The heater protective layer 13 has the electrode opening portions 13a and 13a for exposing the foregoing electrodes 12 and 12 and is disposed so as to cover the heater 11. The heater protective layer 13 can be formed of, for example, photosensitive polyimide, polyimide varnish, or the like. The thickness of the heater protective layer 13 can be suitably set taking into account a material to be used and so on.

In the microreactor 1 of the present invention as described above, the catalyst carrying member 15 is disposed in the flow path 8 and therefore the catalyst C is not directly supported on the wall surfaces of the microchannel portions 5 and 7 (wall surface of the flow path 8) of the substrates 4 and 6, so that it is possible to select the substrates 4 and 6 without considering the catalyst supportability thereof. For example, metal substrates having a high thermal conductivity can be used to efficiently transmit the heat from the heater 11 to the inside of the flow path, thereby improving the reaction efficiency.

Second Embodiment

Figure 6:
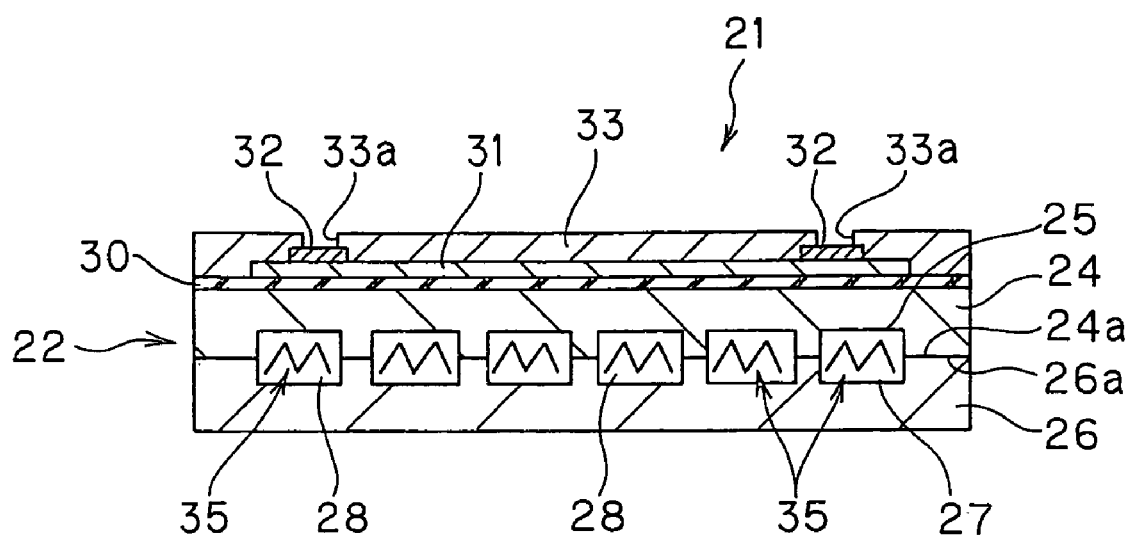
FIG. 6 is a longitudinal sectional view, corresponding to FIG. 2, showing another embodiment of a microreactor of the present invention.

FIG. 6 is a longitudinal sectional view, corresponding to FIG. 2, showing another embodiment of a microreactor of the present invention. In FIG. 6, the microreactor 21 of the present invention comprises a joined body 22 in which a substrate 24 formed with a microchannel portion 25 on one surface 24a thereof, and a substrate 26 formed with a microchannel portion 27 on one surface 26a thereof are joined together such that the microchannel portion 25 and the microchannel portion 27 confront each other. Inside the joined body 22, there is formed a flow path 28 composed of the confronting microchannel portions 25 and 27, and a catalyst carrying member 35 is disposed inside the flow path 28. Further, both end openings of the flow path 28 are exposed at one end surface of the foregoing joined body 22 to form a feed material inlet (not illustrated) and a product recovery port (not illustrated), respectively. Further, a heater 31 is provided on a surface 24b of the substrate 24 via an insulating layer 30. The heater 31 is formed with electrodes 32 and 32, and a heater protective layer 33 having electrode opening portions 33a and 33a for exposing the electrodes 32 and 32 is provided so as to cover the heater 31.

Figure 7:
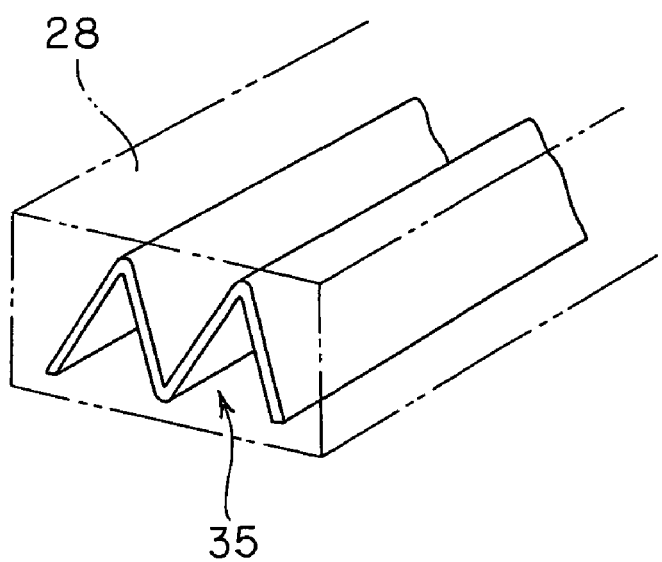
FIG. 7 is a perspective view of a catalyst carrying member forming the microreactor shown in FIG. 6.

This microreactor 21 differs from the foregoing microreactor 1 in that, as shown in FIG. 7, the catalyst carrying member 35 disposed in the flow path 28 has a wavelike plate shape in section and the shape of the flow path 28 in a plane perpendicular to the flow direction is rectangular for disposing the catalyst carrying member 35 therein.

Figure 8:
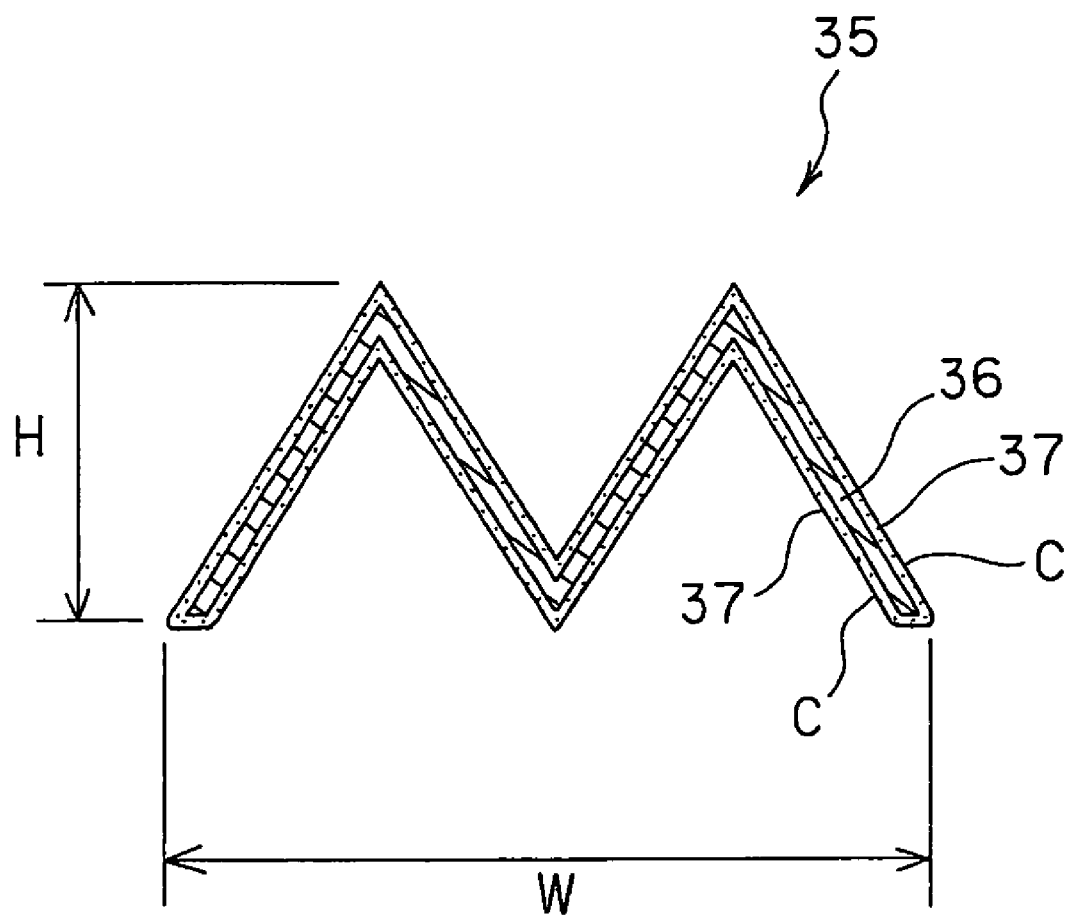
FIG. 8 is an enlarged sectional view of the catalyst carrying member shown in FIG. 7.

As shown in FIG. 8, a sectional structure of the catalyst carrying member 35 comprises a wavelike metal base body 36 and a metal oxide film 37 covering the metal base body 36, wherein a catalyst C is supported on this metal oxide film 37. Materials and forming methods of the metal base body 36 and the metal oxide film 37 forming the catalyst carrying member 35 can be the same as those of the metal base body 16 and the metal oxide film 17 in the foregoing embodiment. Further, the width W and height H of the catalyst carrying member 35 can be suitably set taking into account the thickness of the flow path 28, easiness of material flow within the flow path 28, and so on.

The catalyst C, the insulating layer 30, the heater 31, the electrodes 32 and 32, and the heater protective layer 33 forming the microreactor 21 can be the same as the catalyst C, the insulating layer 10, the heater 11, the electrodes 12 and 12, and the heater protective layer 13 forming the microreactor 1, respectively, and therefore, explanation thereof is omitted.

In the microreactor 21 of the present invention as described above, the catalyst carrying member 35 is disposed in the flow path 28 and therefore the catalyst C is not directly supported on the wall surfaces of the microchannel portions 25 and 27 (wall surface of the flow path 28) of the substrates 24 and 26, so that it is possible to select the substrates 24 and 26 without considering the catalyst supportability thereof. For example, metal substrates having a high conductivity can be used to efficiently transmit the heat from the heater 31 to the inside of the flow path, thereby improving the reaction efficiency.

Third Embodiment

Figure 9:
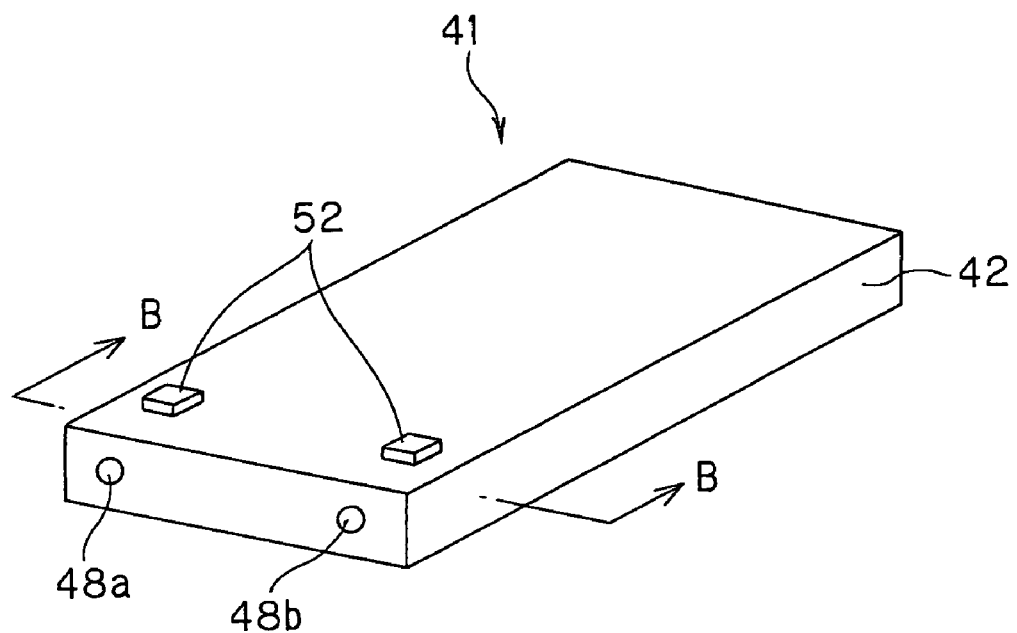
FIG. 9 is a perspective view showing another embodiment of a microreactor of the present invention.
Figure 10:
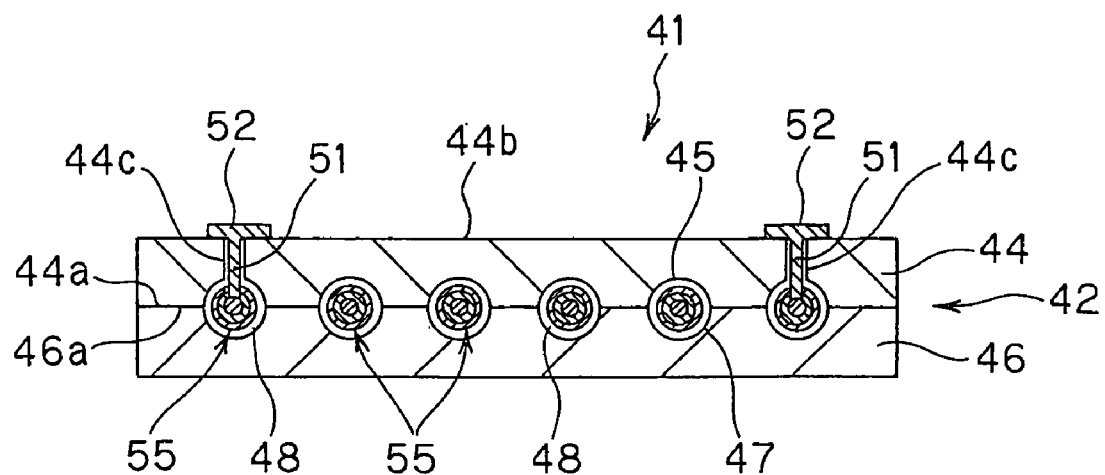
FIG. 10 is an enlarged longitudinal sectional view of the microreactor shown in FIG. 9, taken along line B-B.

FIG. 9 is a perspective view showing another embodiment of a microreactor of the present invention, and FIG. 10 is an enlarged longitudinal sectional view of the microreactor shown in FIG. 9, taken along line B-B. In FIGS. 9 and 10, the microreactor 41 of the present invention comprises a joined body 42 in which a substrate 44 formed with a microchannel portion 45 on one surface 44a thereof, and a substrate 46 formed with a microchannel portion 47 on one surface 46a thereof are joined together such that the microchannel portion 45 and the microchannel portion 47 confront each other. Inside the joined body 42, there is formed a flow path 48 composed of the confronting microchannel portions 45 and 47, and a catalyst carrying member 55 is disposed inside the flow path 48. Further, both end openings of the flow path 48 are exposed at one end surface of the foregoing joined body 42 to form a feed material inlet 48a and a product recovery port 48b, respectively.

Like the microchannel portions 5 and 7 provided on the substrates 4 and 6 forming the foregoing microreactor 1, the microchannel portions 45 and 47 are each formed on the corresponding substrate in a meandering shape (see FIG. 3).

Figure 11:
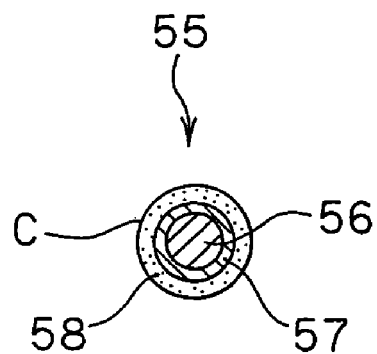
FIG. 11 is a longitudinal sectional view of a catalyst carrying member forming the microreactor shown in FIG. 9.

The catalyst carrying member 55 is a single member that meanders corresponding to the meandering shapes of the foregoing microchannel portions 45 and 47 and, as shown in FIG. 11, its sectional structure is such that a metal film 57 and a metal oxide film 58 are provided so as to cover an electric heater 56 and a catalyst C is supported on the metal oxide film 58 being an outermost layer. The electric heater 56 incorporated in the catalyst carrying member 55 is connected to electrodes 52 and 52 near both end portions of the catalyst carrying member 55 via lines 51 and 51 that are provided in through holes 44c and 44c formed in the substrate 44.

The substrates 44 and 46 having the microchannel portions 45 and 47 can be the same as the substrates 4 and 6 forming the foregoing microreactor 1 except that the substrate 44 has the through holes 44c and 44c.

The catalyst carrying member 55 forming the microreactor 41 incorporates therein the electric heater and, as described above, comprises the metal film 57 and the metal oxide film 58 so as to cover the electric heater 56 and further comprises the catalyst C supported on the metal oxide film 58 being the outermost layer.

As the electric heater 56, use can be made of an electric heating material such as nichrome (Ni—Cr alloy), W (tungsten), or Mo (molybdenum). Although the electric heater 56 has a continuous wire shape being circular in section in the illustrated example, there is no particular limitation to the sectional shape thereof. The thickness of the electric heater 56 can be suitably set taking into account a use of the microreactor 41, the thickness and length of the flow path 48, easiness of material flow within the flow path 48, the electric heating material, and so on and can be set within a range of, for example, about 100 to 800 μm.

As the metal film 57, use can be made of, for example, a metal that can form the metal oxide film 58 by anodic oxidation. As such a metal, there can be cited, for example, Al, Si, Ta, Nb, V, Bi, Y, W, Mo, Zr, Hf, or the like. Further, as the metal film 57, use can also be made of a material that can form the metal oxide film 58 through a boehmite treatment, for example, Cu, stainless, Fe, Al, or the like.

The metal oxide film 58 is provided for carrying the catalyst C and may be formed by the anodic oxidation of the metal film 57 or the boehmite treatment thereof as described above. Such a metal oxide film 58 has microholes and thus enables a large carrying amount of the catalyst C and stable catalyst supporting.

The formation of the metal oxide film 58 by the anodic oxidation of the metal film 57 can be implemented by, in the state where the metal film 57 coating the electric heater 56 is connected to an anode of external electrodes, immersing the metal film 57 in an anode oxidizing solution so as to confront a cathode and energizing those. The thickness of the metal oxide film 58 can be set within a range of, for example, about 10 to 100 μm.

On the other hand, the formation of the metal oxide film 58 by the boehmite treatment can be implemented by, for example, using a suspension with boehmite alumina being dispersed therein, such as alumina sol, and applying the suspension with a fully lowered viscosity to the metal film 57 (or immersing the metal film 57 coating the electric heater 56 therein), thereafter, drying it to fix a boehmite coating on the surface of the metal film 57. The metal oxide film 58 formed by such a boehmite treatment is an aluminum oxide thin film and the thickness thereof can be set within a range of, for example, about 0.1 to 2 μm.

The catalyst C supported on the metal oxide film 58 can be suitably selected depending on a use of the microreactor 41 and there is no particular limitation thereto.

The shape of the catalyst carrying member 55 is, like the foregoing catalyst carrying member 15, a single meandering shape, but is not limited thereto. For example, each may have the linear shape as shown in FIG. 5. However, when disposing the linear catalyst carrying members 55 at respective linear portions in the flow path 48, a pair of lines 51 and 51 for connection to a heater 56 should be provided and a pair of through holes 44c and 44c for enabling such wiring should be formed in the substrate 44 for each catalyst carrying member 55. Electrodes 52 and 52 may be configured such that a pair of positive and negative electrodes are arranged and the heaters 56 of the plurality of catalyst carrying members 55 are connected thereto via the plurality of lines 51, or that a pair of electrodes are provided for each of the heaters 56 of the individual catalyst carrying members 55.

The catalyst carrying member 55 incorporating therein the electric heater may be configured such that the metal oxide film 58 is provided so as to cover the electric heater 56 and the catalyst C is supported on this metal oxide film 58. That is, the metal oxide film 58 is directly formed on the electric heater 56 without interposing the metal film 57 therebetween. In this case, as the electric heater 56, it is possible to use the same material as that of the foregoing electric heater 56. The metal oxide film 58 can be formed by the boehmite treatment.

In the microreactor 41 of the present invention as described above, the catalyst carrying member 55 is disposed in the flow path 48 and therefore the catalyst C is not directly supported on the wall surfaces of the microchannel portions 45 and 47 (wall surface of the flow path 48) of the substrates 44 and 46, so that it is possible to select the substrates 44 and 46 without considering the catalyst supportability thereof. Further, since the electric heater 56 is incorporated in the catalyst carrying member 55, the catalyst C can be heated to a proper temperature in a moment to thereby enable a microreactor where the rising speed upon starting up from the stopped state is high and the utilization efficiency of the input power is high. Further, by the use of ceramic substrates of silicon, ceramics, or the like having a low thermal conductivity, it is possible to improve the heat utilization efficiency by preventing radiation of heat within the flow path 48.

Fourth Embodiment

Figure 12:
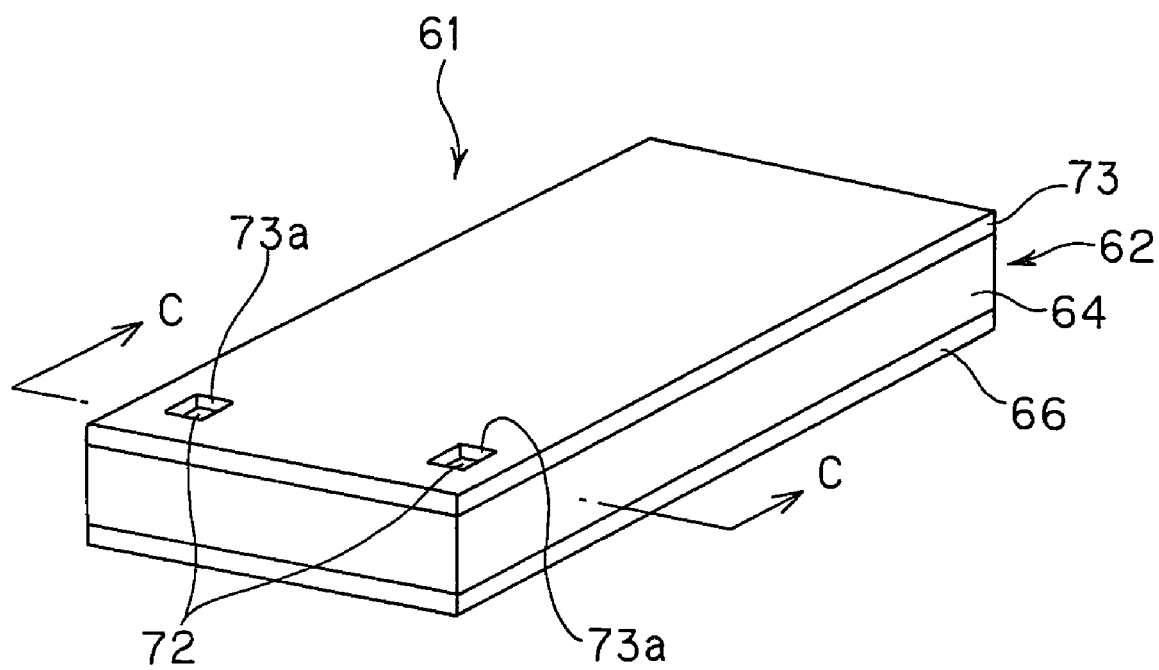
FIG. 12 is a perspective view showing another embodiment of a microreactor of the present invention.
Figure 13:
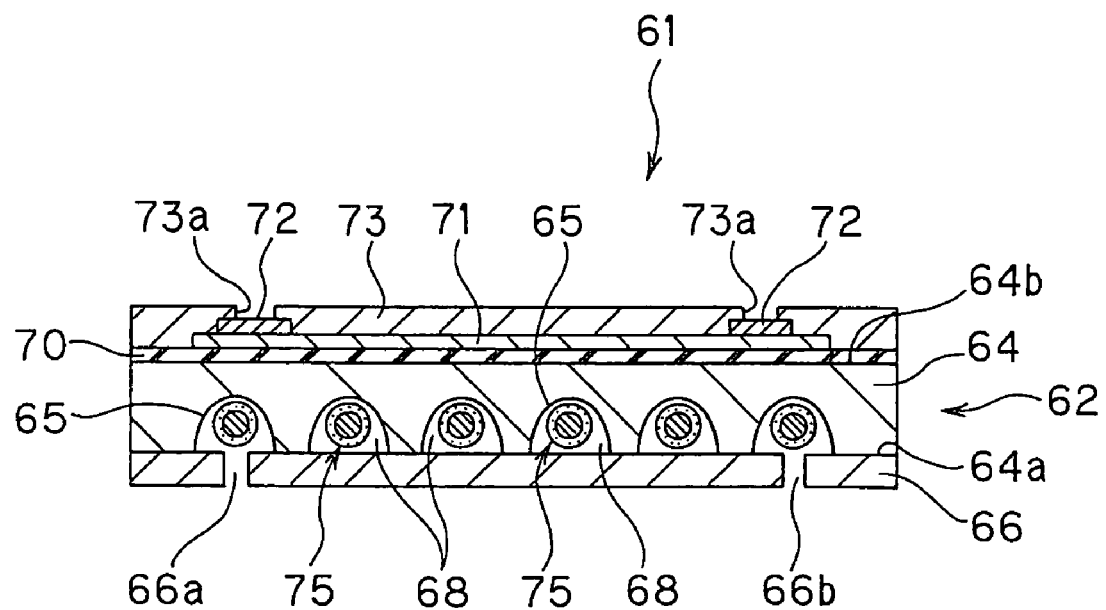
FIG. 13 is an enlarged longitudinal sectional view of the microreactor shown in FIG. 12, taken along line C-C.

FIG. 12 is a perspective view showing another embodiment of a microreactor of the present invention, and FIG. 13 is an enlarged longitudinal sectional view of the microreactor shown in FIG. 12, taken along line C-C. In FIGS. 12 and 13, the microreactor 61 of the present invention has a joined body 62 comprising a substrate 64 formed with a microchannel portion 65 on one surface 64a thereof, and a substrate (cover member) 66 joined to the surface 64a of the substrate 64 so as to cover the microchannel portion 65. Inside the joined body 62, there is formed a flow path 68 composed of the microchannel portion 65 and the substrate 66, and a catalyst carrying member 75 is disposed inside the flow path 68. The substrate (cover member) 66 is provided with a feed material inlet 66a and a product recovery port 66b which are located at both end portions of the flow path 68. Further, a heater 71 is provided on the surface 64b of the substrate 64 via an insulating layer 70. The heater 71 is formed with electrodes 72 and 72, and a heater protective layer 73 having electrode opening portions 73a and 73a for exposing the electrodes 72 and 72 is provided so as to cover the heater 71.

Like the microchannel portion 5 shown in FIG. 3, the microchannel portion 65 provided on the substrate 64 forming the microreactor 61 is formed so as to turn back by 180 degrees at respective tip portions of comb-shaped ribs and has a shape that is continuous from an end portion 3a to an end portion 3b while meandering. However, both end portions of the microchannel portion 65 are not exposed at an end surface of the substrate 64 but are located in the surface 64a of the substrate 64. Further, it is configured that the feed material inlet 66a of the substrate 66 is located at one end portion of the microchannel portion 65, while the product recovery port 66b is located at the other end portion of the microchannel portion 65.

The substrate 64 forming the microreactor 61 can be the same as the foregoing substrate 4 or 24. On the other hand, the substrate 66 serves as a cover member and a material thereof may be the same as that of the substrate 64 or different therefrom.

The catalyst carrying member 75 forming the microreactor 61 can be the same as the foregoing catalyst carrying member 15 or 35 and thus explanation thereof is omitted herein. On the other hand, like the foregoing catalyst carrying member 55, the catalyst carrying member 75 may incorporate therein an electric heater. In this case, the heater 71 may be unnecessary, while it is necessary that, like in the foregoing microreactor 41, the heater incorporated in the catalyst carrying member be connected to the electrodes provided in the joined body.

The catalyst C, the insulating layer 70, the heater 71, the electrodes 72 and 72, and the heater protective layer 73 forming the microreactor 61 can be the same as the catalyst C, the insulating layer 10, the heater 11, the electrodes 12 and 12, and the heater protective layer 13 forming the microreactor 1, respectively, and therefore, explanation thereof is omitted herein.

The foregoing embodiments of the microreactors are only examples and the present invention is not limited thereto. For example, the positions of the feed material inlet and the product recovery port can be set to arbitrary positions by changing the shape of the microchannel portions (shape of the flow path).

Production Method of Microreactor

First Embodiment

FIGS. 14A to 14C and FIGS. 15A to 15C are process diagrams for describing one embodiment of the microreactor producing method of the present invention.

In FIGS. 14A to 14C and FIGS. 15A to 15C, description will be made using the foregoing microreactor 1 as an example.

Figure 14A:
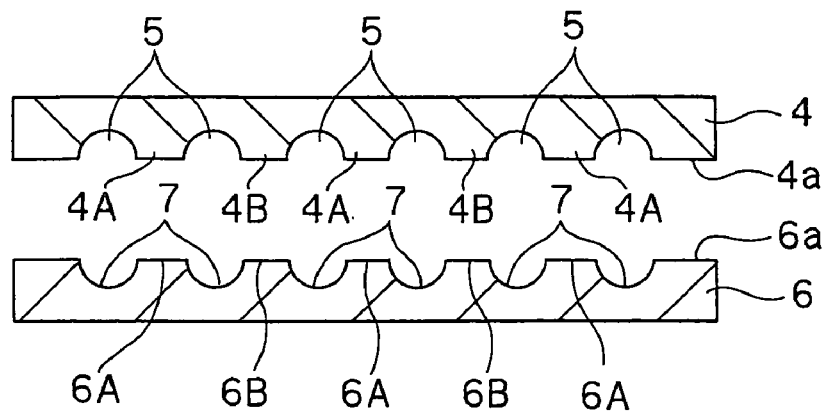
FIGS. 14A to 14C are process diagrams for describing one embodiment of a microreactor producing method of the present invention.
Figure 14B:
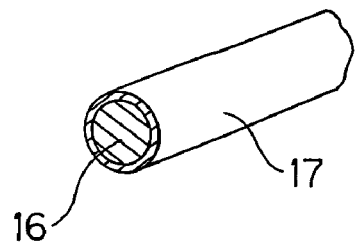

In the production method of the present invention, at the outset, in a channel portion forming process, a microchannel portion 5 is formed on one surface 4a of a substrate 4, and a microchannel portion 7 is formed on one surface 6a of a substrate 6 (FIG. 14A). The microchannel portion 5, 7 can be formed by forming a resist having a predetermined opening pattern on the surface 4a, 6a of the substrate 4, 6 and etching the substrate 4, 6 to leave comb-shaped ribs 4A and 4B, 6A and 6B by wet etching using the resist as a mask. It is also possible to form the microchannel portion 5, 7 by the use of router processing, press working, sandblasting method, or the like.

The metal substrates 4 and 6 form a pair of substrates wherein pattern shapes (meandering shapes in the example) of the microchannel portion 5 and the microchannel portion 7 that are formed have a symmetrical relationship with respect to a joining plane (4a, 6a) between the substrates 4 and 6. The substrates 4 and 6 to be used can be suitably selected from metal, silicon, ceramics, and the like without considering catalyst supportability thereof.

Figure 14C:
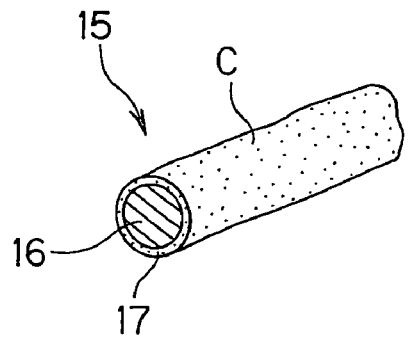

Further, independently of the foregoing channel portion forming process, a catalyst carrying member 15 having a meandering shape corresponding to the microchannel portions 5 and 7 is produced in a catalyst applying process. That is, a metal oxide film 17 is formed so as to cover a metal base body 16 (FIG. 14B) and a catalyst C is applied on this metal oxide film 17, thereby producing the catalyst carrying member 15 (FIG. 14C).

The metal base body 16 can be made of a metal that can form the metal oxide film 17 by anodic oxidation, for example, Al, Si, Ta, Nb, V, Bi, Y, W, Mo, Zr, Hf, or the like. On the other hand, the metal base body 16 may also be made of Cu, stainless, Fe, Al, or the like that can form the metal oxide film 17 through a boehmite treatment.

The formation of the metal oxide film 17 by the anodic oxidation on the metal base body 16 can be implemented by, in the state where the metal base body 16 is connected to an anode of external electrodes, immersing the metal base body 16 in an anode oxidizing solution so as to confront a cathode and energizing those. On the other hand, the formation of the metal oxide film 17 by the boehmite treatment can be implemented by, for example, using a suspension with boehmite alumina being dispersed therein, such as alumina sol, and applying the suspension with a fully lowered viscosity to the metal base body 16 (or immersing the metal base body 16 therein), thereafter, drying it to fix a boehmite coating on the surface of the metal base body 16.

Applying of the catalyst C onto the metal oxide film 17 can be implemented by, for example, immersing the metal base body 16 coated with the metal oxide film 17 in a catalyst precursor solution or applying the catalyst precursor solution thereto to thereby adhere a proper amount to the metal oxide film 17 and thereafter drying the catalyst precursor solution.

The processing of the catalyst carrying member 15 into the meandering shape corresponding to the microchannel portions 5 and 7 can be implemented at any time from the state before formation of the metal oxide film 17 on the metal base body 16 to the state after applying of the catalyst C.

In this catalyst applying process, as described above, since the metal oxide film 17 can be uniformly formed on the metal base body 16 and the catalyst precursor solution can be uniformly adhered to the metal oxide film 17, the catalyst can be uniformly applied in a desired applying amount.

Figure 15A:
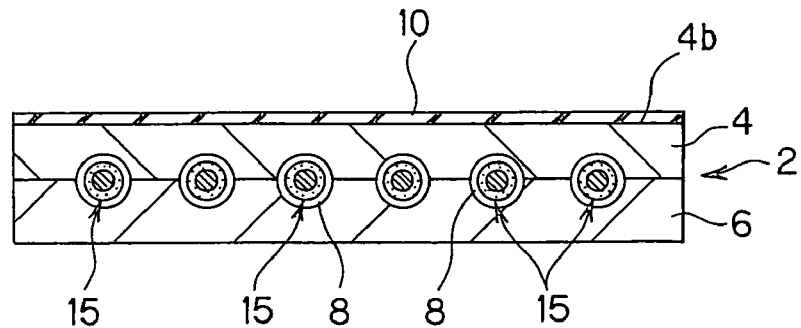
FIGS. 15A to 15C are process diagrams for describing one embodiment of a microreactor producing method of the present invention.

Then, in a joining process, the pair of substrates 4 and 6 are joined together at the surfaces 4a and 6a such that the microchannel portion 5 and the microchannel portion 7 confront each other and the catalyst carrying member 15 is disposed between the microchannel portion 5 and the microchannel portion 7, thereby to form a joined body 2 (FIG. 15A). As described above, the microchannel portion 5 and the microchannel portion 7 have the pattern shapes that are in a symmetrical relationship with respect to the joining plane (4a, 6a) between the substrates 4 and 6. Therefore, by the joining between the metal substrates 4 and 6, the microchannel portion 5 and the microchannel portion 7 completely confront each other to form a flow path 8. The joining between the substrates 4 and 6 can be carried out by, for example, diffusion bonding, brazing, laser welding, resistance welding, anodic bonding (when the substrates 4 and 6 are silicon), or the like.

Figure 15B:
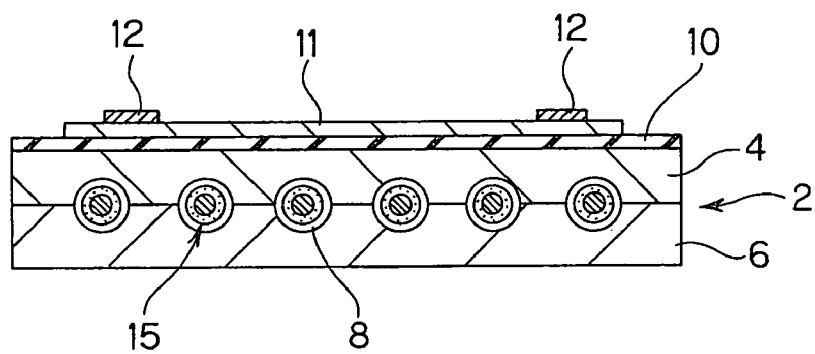

Then, an insulating layer 10 is formed on one surface (surface 4b of the substrate 4) of the joined body 2, a heater 11 is provided on the insulating layer 10, and further, electrodes 12 and 12 for energization are formed (FIG. 15B).

When the substrate 4 can form a metal oxide by anodic oxidation, the insulating layer 10 can be formed by anodic oxidation. In this case, a metal oxide (insulating layer 10) can be formed by connecting the joined body 2 to an anode of external electrodes, immersing a desired surface of the joined body 2 in an anode oxidizing solution so as to confront a cathode and energizing those. On the other hand, the insulating layer 10 may be formed by an electrically insulating material such as polyimide or ceramic ($Al_2O_3$, $SiO_2$).

The heater 11 can be formed using a material such as carbon paste, nichrome (Ni—Cr alloy), W, or Mo. As a method of forming the heater 11, there can be cited a method of forming it by screen printing using a paste containing the foregoing material, a method of forming an applied film using a paste containing the foregoing material, then patterning it by etching or the like, a method of patterning it on an insulating film via a metal mask having a wiring pattern by the use of the vacuum deposition method, or the like.

On the other hand, the energization electrodes 12 and 12 can be formed using a conductive material such as Au, Ag, Pd, or Pd—Ag. For example, they can be formed by screen printing using a paste containing the foregoing conductive material.

Figure 15C:
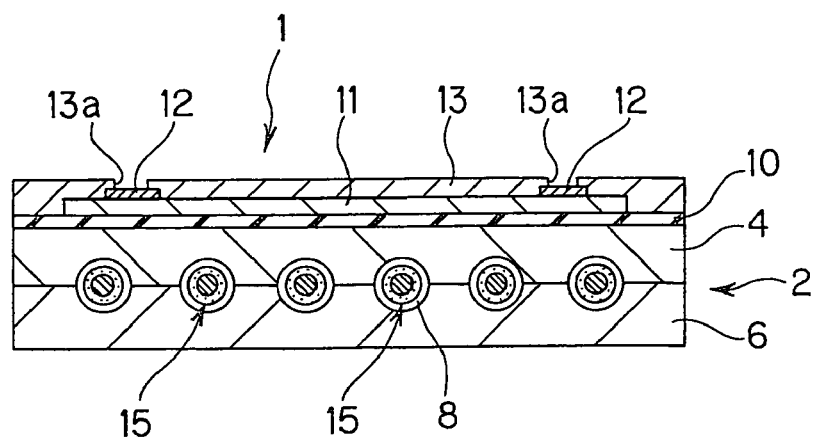

Then, a heater protective layer 13 is formed on the heater 11 so as to expose the electrodes 12 and 12 (FIG. 15C). Thereby, the microreactor 1 of the present invention is obtained. The heater protective layer 13 can be formed using a material such as polyimide or ceramic ($Al_2O_3$, $SiO_2$). For example, it can be formed in a pattern having electrode opening portions 13a and 13a by screen printing using a paste containing the foregoing material.

According to this embodiment as described above, it is also possible to produce a microreactor 1 having linear catalyst carrying members 15 as shown in FIG. 5.

Further, using, in place of the substrate 6, the substrate 66 formed with no microchannel portion, the foregoing microreactor 61 can be produced by the same processes as described above. However, let the substrate 64 formed with the microchannel portion 65 be configured such that both end portions of the microchannel portion 65 are not exposed at an end surface of the substrate 64 but are located in the surface 64a of the substrate 64 and the substrate 66 is provided with the feed material inlet 66a and the product recovery port 66b.

Second Embodiment

FIGS. 16A to 16D and FIGS. 17A to 17B are process diagrams for describing another embodiment of the microreactor producing method of the present invention.

In FIGS. 16A to 16D and FIGS. 17A to 17B, description will be made using the foregoing microreactor 41 as an example.

Figure 16A:
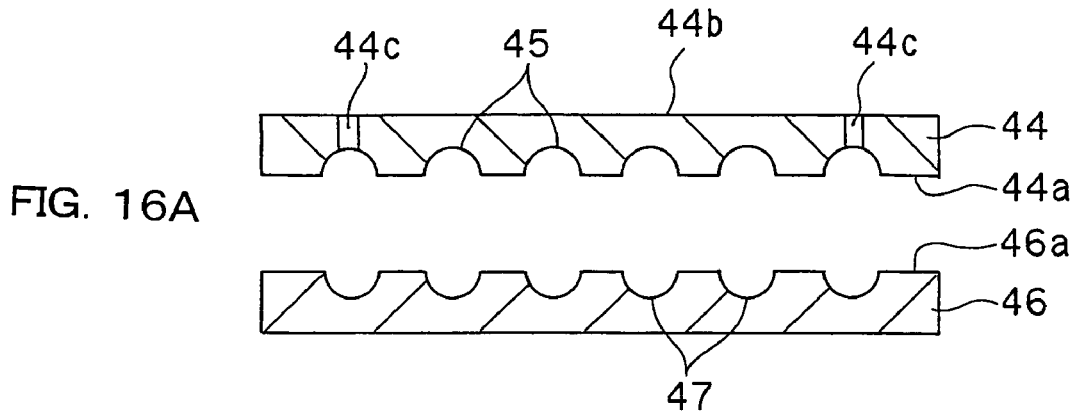
FIGS. 16A to 16D are process diagrams for describing another embodiment of a microreactor producing method of the present invention.
Figure 16B:
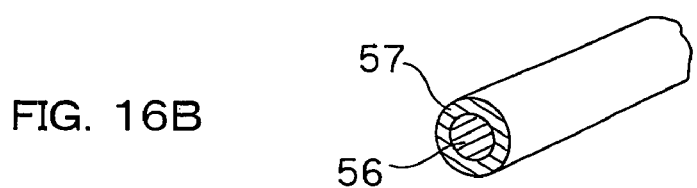
Figure 16C:
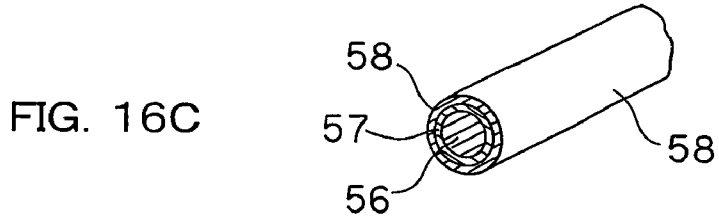

In the production method of the present invention, at the outset, in a channel portion forming process, a microchannel portion 45 is formed on one surface 44a of a substrate 44, and a microchannel portion 47 is formed on one surface 46a of a substrate 46. Further, two through holes 44c and 44c are formed at predetermined portions of the microchannel portion 45 (FIG. 16A). The formation of the microchannel portions 45 and 47 on the substrates 44 and 46 can be implemented like the formation of the microchannel portions 5 and 7 on the substrates 4 and 6 in the foregoing embodiment. On the other hand, the formation of the through holes 44c and 44c can be implemented by forming a resist having predetermined openings on a surface 44b of the substrate 44 simultaneously with a resist for formation of the microchannel portion 45 and carrying out double-sided etching. Alternatively, the through holes 44c and 44c may be formed by drilling.

Figure 16D:
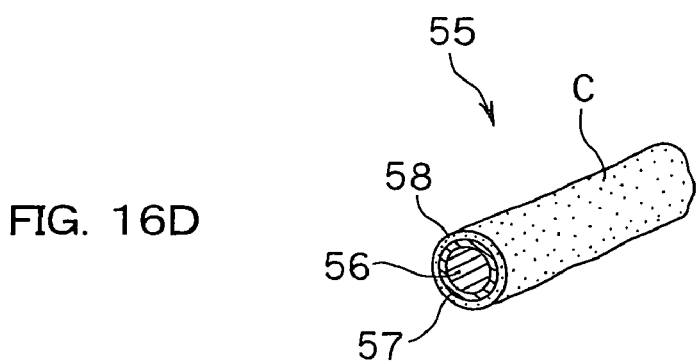

Independently of the foregoing channel portion forming process, a catalyst carrying member 55 having a meandering shape corresponding to the microchannel portions 45 and 47 is produced in a catalyst applying process. That is, a metal film 57 is formed so as to cover an electric heater 56 (FIG. 16B), a metal oxide film 58 is formed so as to cover the metal film 57 (FIG. 16C), and thereafter, a catalyst C is applied on the metal oxide film 58, thereby producing the catalyst carrying member 55 (FIG. 16D).

As the electric heater 56, use can be made of an electric heating material such as nichrome (Ni—Cr alloy), W (tungsten), or Mo (molybdenum). In the illustrated example, the electric heater 56 has a continuous wire shape being circular in section.

The metal film 57 can be formed so as to cover the electric heater 56 by the use of a method such as electroless plating, hot dipping, or cladding. As a material of the metal film 57, use can be made of the same material as that of the foregoing metal base body 16. The thickness of the metal film 57 may take any value as long as the thickness in the state where the metal oxide film 58 is formed does not impede excitation heating by the electric heater 56, and is preferably set within a range of, for example, 1 to 10 µm.

The formation of the metal oxide film 58 to cover the metal film 57 can be implemented by a method using anodic oxidation of the metal film 58 or a method using a boehmite treatment thereof, and the forming method can be the same as in the foregoing embodiment.

Further, applying of the catalyst C on the metal oxide film 58 can be performed like in the foregoing embodiment.

As described above, in the case where the catalyst carrying member 55 is composed of the electric heater 56, the metal oxide film 58 covering it, and the catalyst C carried by the metal oxide film 58, the formation of the metal oxide film 58 on the electric heater 56 can be carried out by the foregoing method based on the boehmite treatment.

In this catalyst applying process, as described above, since the metal oxide film 17 can be uniformly formed on the metal base body 16 and the catalyst precursor solution can be uniformly adhered to the metal oxide film 17, the catalyst can be uniformly applied in a desired applying amount.

It is necessary that the electric heater 56 incorporated in the catalyst carrying member 55 be connected to electrodes 52 in a later process. Accordingly, the metal oxide film 58 and the metal film 57 are removed at predetermined portions thereof so as to expose the electric heater 56. Removal of the metal oxide film 58 and the metal film 57 is implemented by, for example, removal by polishing, dissolution removal using a chemical liquid such as a sodium hydroxide aqueous solution, or the like. Alternatively, it may be arranged that, in the process of forming the metal oxide film 58 by the foregoing anodic oxidation, a resist is provided at portions for connection to the electrodes 52 (portions not to be formed with the metal oxide film 58) and the metal oxide film 58 is formed only at a portion where the metal film 57 is exposed (partial anodic oxidation). The processing of the catalyst carrying member 55 into the meandering shape corresponding to the microchannel portions 45 and 47 may be implemented at any time from the state before the formation of the metal film 57 on the electric heater 56 to the state after the applying of the catalyst C.

Figure 17A:
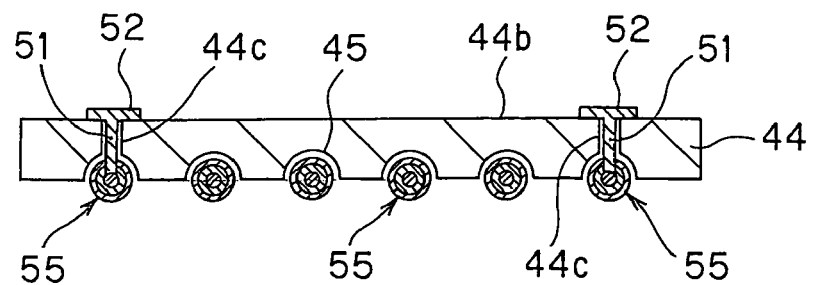
FIGS. 17A to 17B are process diagrams for describing another embodiment of a microreactor producing method of the present invention.

Then, in a joining process, the catalyst carrying member 55 is disposed in the microchannel portion 45 of the substrate 44, and the electric heater 56 incorporated in the catalyst carrying member 55 and the electrodes 52 and 52 are connected together via lines 51 and 51 disposed in the through holes 44c and 44c formed in the substrate 44 (FIG. 17A). The formation of the lines 51 and 51 in the through holes 44c and 44c can be carried out by filling by plating, filling by conductive paste printing, or the like. As a material of the lines 51 and 51, use can be made of a conductive material such as Au, Ag, Pd, or Pd—Ag. Further, the electrodes 52 and 52 for energization can be formed using a conductive material such as Au, Ag, Pd, or Pd—Ag and, for example, can be formed integral with the foregoing lines 51 and 51.

Figure 17B:
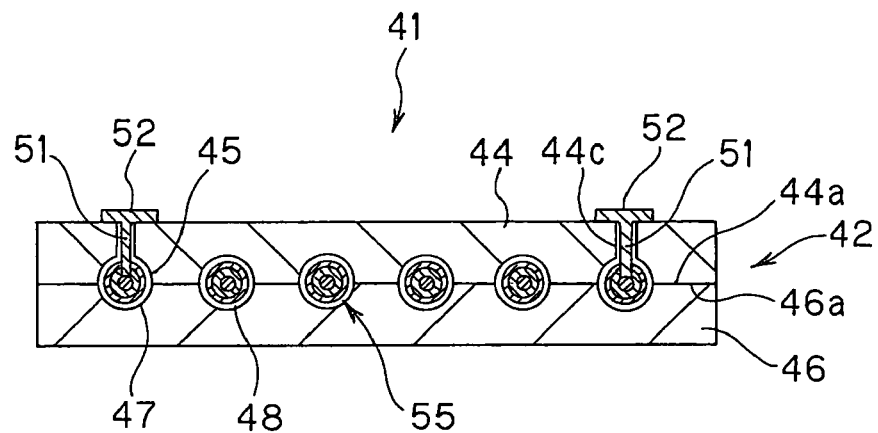

Then, the substrates 44 and 46 are joined together at the surfaces 44*a* and 46*a* such that the microchannel portion 45 and the microchannel portion 47 confront each other, thereby forming a joined body 42 (FIG. 17B). Thereby, the microreactor 41 of the present invention is obtained. As described above, the microchannel portion 45 and the microchannel portion 47 have the pattern shapes that are in a symmetrical relationship with respect to the joining plane (44*a*, 46*a*) between the substrates 44 and 46. Therefore, by the joining between the substrates 44 and 46, the microchannel portion 45 and the microchannel portion 47 completely confront each other to form a flow path 48. In this flow path 48, the catalyst carrying member 55 is disposed. The joining between the substrates 44 and 46 can be implemented like in the foregoing embodiment.

According to this embodiment as described above, it is also possible to produce a microreactor 1 having linear catalyst carrying members 15 as shown in FIG. 5.

Further, using, in place of the substrate 46, the substrate 66 formed with no microchannel portion, the foregoing microreactor 61 can be produced by the same processes as described above. However, let the substrate 64 formed with the microchannel portion 65 be configured such that both end portions of the microchannel portion 65 are not exposed at an end surface of the substrate 64 but are located in the surface 64*a* of the substrate 64 and the substrate 66 is provided with the feed material inlet 66*a* and the product recovery port 66*b*.

Third Embodiment

Figure 18A:
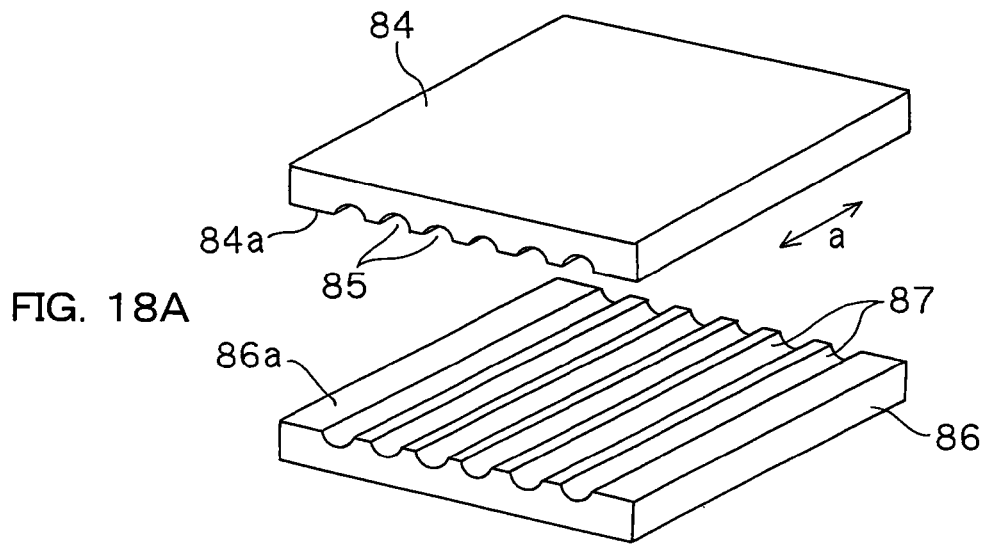
FIGS. 18A to 18C are process diagrams for describing another embodiment of a microreactor producing method of the present invention.
Figure 18B:
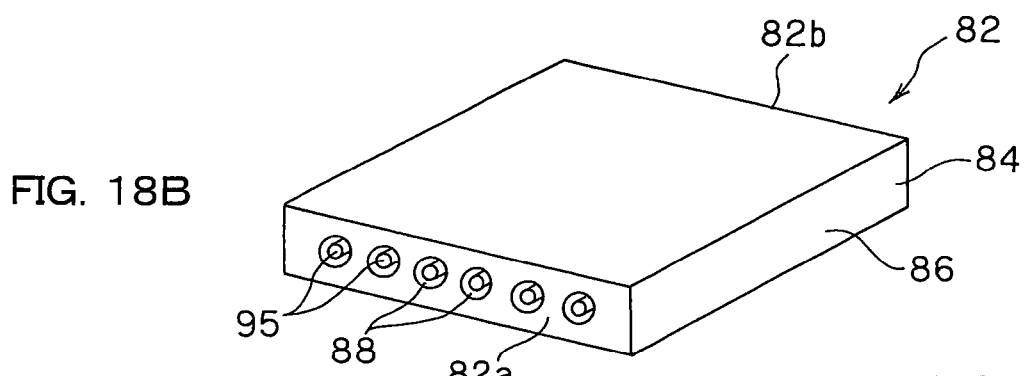
Figure 18C:
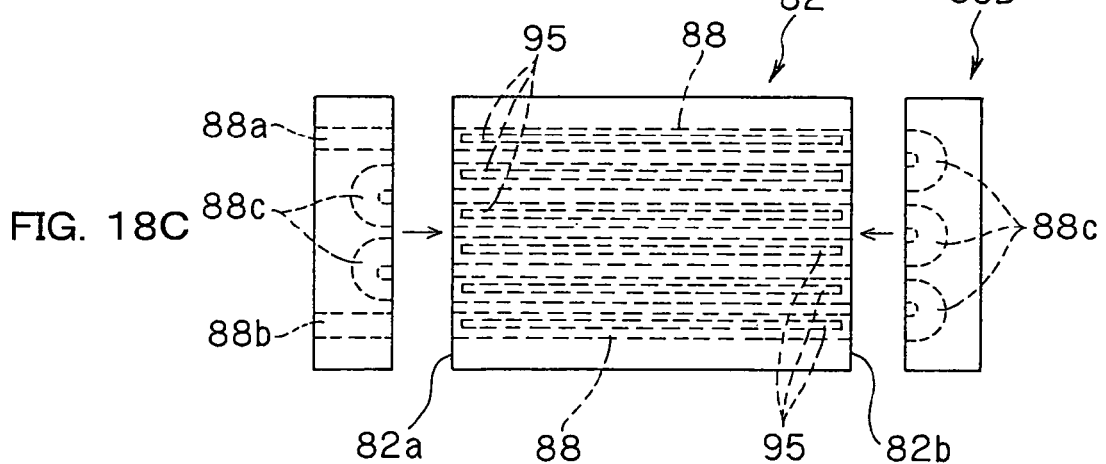

FIGS. 18A to 18C are process diagrams for describing another embodiment of the microreactor producing method of the present invention.

In FIGS. 18A to 18C, description will be made using, as an example, the microreactor 1 having the linear catalyst carrying members 15 as shown in FIG. 5.

In the production method of the present invention, at the outset, in a channel portion forming process, a plurality of microchannel portions 85 are formed on one surface 84*a* of a substrate 84 so as to extend in a predetermined direction (direction of arrow a) in parallel to each other, and a plurality of microchannel portions 87 are formed on one surface 86*a* of a substrate 86 so as to extend in the predetermined direction (direction of arrow a) in parallel to each other (FIG. 18A). The formation of the microchannel portions 85 and 87 on the substrates 84 and 86 can be carried out like the formation of the microchannel portions 5 and 7 on the substrates 4 and 6 in the foregoing embodiment, and pattern shapes (linear shapes in the example) and the forming numbers of the microchannel portions 85 and the microchannel portions 87 that are formed are in a symmetrical relationship with respect to a joining plane (84*a*, 86*a*) between the substrates 84 and 86.

Independently of the foregoing channel portion forming process, linear catalyst carrying members 95 are produced in a catalyst applying process. The production of the catalyst carrying members 95 can be carried out like the production of the foregoing catalyst carrying member 15. The length of the catalyst carrying member 95 can be suitably set taking into account the length of the microchannel portion 85, 87, the turnback flow path shape of a later-described terminating member, and so on.

Then, in a first joining process, the pair of substrates 84 and 86 are joined together at the surfaces 84*a* and 86*a* such that the microchannel portions 85 and the microchannel portions 87 confront each other and the catalyst carrying members 95 are disposed between the microchannel portions 85 and the microchannel portions 87, thereby forming a joined body 82 (FIG. 18B). By the joining between the substrates 84 and 86, the microchannel portions 85 and the microchannel portions 87 completely confront each other to form a plurality of (six in the illustration) flow paths 88 and opening portions of each flow path 88 are exposed at both end portions 82*a* and 82*b* of the joined body 82.

Then, in a second joining process, terminating members 83A and 83B having turnback flow paths are joined to both end portions 82*a* and 82*b* of the joined body 82 where the opening portions of the flow paths 88 are exposed (FIG. 18C). The terminating member 83A is formed with flow paths 88*a* and 88*b* that will serve as a feed material inlet and a product recovery port and two turnback U-shaped flow paths 88*c*, while the terminating member 83B is formed with three turnback U-shaped flow paths 88*c*. By this second joining, the flow paths 88 form a single continuous flow path meandering from the flow path 88*a* to the flow path 88*b* and the linear catalyst carrying members 95 are disposed at six linear portions of the meandering flow path 88.

Thereafter, through processes like FIGS. 15A to 15C, an insulating layer 10, a heater 11, energization electrodes 12 and 12, and a heater protective layer 13 are formed so that the microreactor 1 in the mode shown in FIG. 5 is obtained.

Also in the microreactor producing method according to this embodiment, it is, of course, possible to produce a microreactor having catalyst carrying members each incorporating therein an electric heater. That is, by employing in this embodiment the production method of the catalyst carrying member 55, the formation of the conduction through holes 44*c* and 44*c*, and the connection between the electrodes and the electric heater shown in FIGS. 16A to 16D and FIGS. 17A to 17B, it is possible to produce a microreactor 41 in the mode where linear catalyst carrying members 55 are respectively disposed at six linear portions of the meandering flow path 48.

Further, using, in place of the substrate 86, a substrate formed with no microchannel portion, the foregoing microreactor 61 can be produced by the same processes as described above. However, it is assumed that, instead of the flow paths 88*a* and 88*b* that will serve as the feed material inlet and the product recovery port, the terminating member 83A is provided with flow paths corresponding to the feed material inlet 66*a* and the product recovery port 66*b*.

In the production methods of the present invention as described above, since the catalyst C is not directly applied in the microchannel portion of the substrate and the catalyst carrying member is produced apart from the formation of the microchannel portion on the substrate, variation in catalyst applying amount is suppressed to enable uniform catalyst applying. Further, since the catalyst applying and the formation of the microchannel portion are independent of each other, contamination and deactivation of the catalyst C and reduction in cleanness of the substrates are prevented and therefore reliability of joining between the substrates is also enhanced.

The foregoing embodiments of the microreactor producing methods are only examples, and the present invention is not limited thereto.

Now, the present invention will be described in further detail showing more specific examples.

Example 1

Channel Portion Forming Process

An Al substrate (25 mm×25 mm) having a thickness of 1000 μm was prepared as a substrate, and a photosensitive resist material (OFPR produced by Tokyo Ohka Kogyo Co., Ltd.) was applied (film thickness 7 μm (dried)) to both surfaces of the Al substrate by the dip method. Then, on the resist film on the side, where a microchannel portion was to be formed, of the Al substrate, there was disposed a photomask having a shape in which stripe-shaped light-shielding portions each having a width of 1500 μm projected (projecting length 20 mm) alternately from right and left at pitches of 2000 μm.

The same Al substrate as described above was prepared, the photosensitive resist material was applied in the same manner, and a photomask was disposed on the resist film on the side, where a microchannel portion was to be formed, of the Al substrate. This photomask was configured to be plane-symmetrical with the foregoing photomask with respect to the Al substrate surface.

Then, with respect to the foregoing pair of metal substrates, the resist films were exposed via the photomasks, respectively, and developed using a sodium hydrogencarbonate solution. As a result, on one surface of each Al substrate, there was formed a resist pattern in which stripe-shaped opening portions each having a width of 500 μm were arrayed at pitches of 2000 μm, and the adjacent stripe-shaped opening portions were alternately continuous with each other at their end portions.

Then, using the foregoing resist pattern as a mask, the Al substrate was subjected to etching (3 minutes) under the following condition.

(Etching Condition)
Temperature: 20° C.
Etching Liquid (HCl) Concentration: 200 g/L (one liter containing pure water and 200 g of 35% HCl dissolved therein)

After the foregoing etching process was finished, the resist pattern was removed using a sodium hydroxide solution and washing was carried out. As a result, on the one surface of each of the pair of Al substrates, there was formed a microchannel portion (flow path length about 220 mm) having a shape wherein stripe-shaped microchannels each having a width of 1000 μm, a depth of 650 μm, and a length of 20 mm were formed at pitches of 2000 μm so as to be alternately continuous with each other at end portions of the adjacent microchannels (the shape continuously meandering while turning back by 180 degrees, as shown in FIG. 3). The shape of the inner wall surface of the microchannel portion was generally semicircular in a section perpendicular to the fluid flow direction.

(Catalyst Applying Process)

An aluminum line having a diameter of 400 μm was prepared as a metal base body. This aluminum line was connected to an anode of external electrodes, immersed in an anode oxidizing solution (4% oxalic acid solution) so as to confront a cathode thereof, and energized under the following condition, thereby forming an aluminum oxide thin film on the surface. The thickness of the aluminum oxide thin film was measured by an ellipsometer, and the result was about 30 μm.

(Anodic Oxidation Condition)
Bath Temperature: 25° C.
Voltage: 25V (DC)

Then, the aluminum line formed with the aluminum oxide thin film was immersed for 2 hours in a catalyst precursor solution having the following composition, taken out, and dried at 350° C. for 6 hours, thereby applying a catalyst (Cu/ZnO) on the aluminum oxide thin film. Thereafter, bending was applied to form it into a shape corresponding to the meandering shapes of the microchannel portions formed on the foregoing Al substrates to thereby obtain a catalyst carrying member having an overall length of 200 mm.

| (Composition of Catalyst Precursor Solution) | |
|---|---|
| Cu | 0.5 mol/L |
| Zn | 0.5 mol/L |

(Joining Process)

Then, the foregoing pair of Al substrates were joined together by brazing under the following condition such that the mutual microchannel portions confronted each other and the foregoing catalyst carrying member was placed in the microchannel portions, thereby producing a joined body. In this joining, positioning was implemented so that the microchannel portions of the pair of Al substrates completely confronted each other. Thereby, a flow path having a feed material inlet and a product recovery port at one end surface of the joined body was formed in the joined body and the catalyst carrying member was disposed in this flow path.

(Brazing Condition)
Brazing Material: AA4004 (produced by Furukawa-Sky Aluminum Corp.)
Atmosphere: Under Vacuum
Brazing Temperature: 600° C.
Joining Time: 3 Minutes Then, an application liquid for insulating layer (Photoneece produced by Toray Industries, Inc.) was applied to one of the AL substrates by a spin coating method and dried, thereby forming an insulating layer (thickness 5 μm).

Then, a paste for heater having the following composition was printed by screen printing on the insulating layer, then cured at 200° C. to form a heater. The formed heater had a shape in which a fine line having a width of 100 μm was drawn around on the Al substrate at line intervals of 100 μm so as to cover the whole of a region (20 mm×20 mm) corresponding to a region where the microchannel portion was formed.

| (Composition of Paste for Heater) | |
|---|---|
| Carbon Powder | 20 weight parts |
| Fine Powder Silica | 25 weight parts |
| Xylene Phenol Resin | 36 weight parts |
| Butyl Carbitol | 19 weight parts |

Further, using a paste for electrode having the following composition, electrodes (0.5 mm×0.5 mm) were formed at predetermined two portions of the heater by screen printing.

| (Composition of Paste for Electrode) | |
|---|---|
| Silver-plated Copper | 90 weight parts |
| Phenol Resin | 6.5 weight parts |
| Butyl Carbitol | 3.5 weight parts |

Then, using a paste for protective layer having the following composition, a heater protective layer (thickness 20 μm)

was formed on the heater by screen printing so as to expose the two electrodes formed on the heater.

| (Composition of Paste for Protective Layer) | |
| --- | --- |
| Resin Concentration | 30 weight parts |
| Silica Filler | 10 weight parts |
| Lactone Solvent (penta-1,4-lactone) | 60 weight parts |

Consequently, a microreactor of the present invention was obtained.

Example 2

Channel Portion Forming Process

An Al substrate (25 mm×25 mm) having a thickness of 1000 µm was prepared as a substrate, and a photosensitive resist material (OFPR produced by Tokyo Ohka Kogyo Co., Ltd.) was applied (film thickness 7 µm (dried)) to both surfaces of the Al substrate by the dip method. Then, on the resist film on the side, where a microchannel portion was to be formed, of the Al substrate, there was disposed a photomask having a shape in which stripe-shaped light-shielding portions each having a width of 1500 µm projected (projecting length 20 mm) alternately from right and left at pitches of 2000 µm.

Then, the resist film was exposed via the photomask and developed using a sodium hydrogencarbonate solution. As a result, on one surface of the Al substrate, there was formed a resist pattern in which stripe-shaped opening portions each having a width of 500 µm were arrayed at pitches of 2000 µm, and the adjacent stripe-shaped opening portions were alternately continuous with each other at their end portions.

Then, using the foregoing resist pattern as a mask, the Al substrate was subjected to etching (3 minutes) under the following condition.
  (Etching Condition)
  Temperature: 20° C.
  Etching Liquid (HCl) Concentration 200 g/L (one liter containing pure water and 200 g of 35% HCl dissolved therein)

After the foregoing etching process was finished, the resist pattern was removed using a sodium hydroxide solution and washing was carried out. As a result, on the one surface of the Al substrate, there was formed a microchannel portion (flow path length about 220 mm) having a shape wherein stripe-shaped microchannels each having a width of 1000 µm, a depth of 650 µm, and a length of 20 mm were formed at pitches of 2000 µm so as to be alternately continuous with each other at end portions of the adjacent microchannels (the shape continuously meandering while turning back by 180 degrees, as shown in FIG. 3). However, this microchannel portion differs from the microchannel portion shown in FIG. 3 in that both end portions of this microchannel portion are located in the surface of the Al substrate. The shape of the inner wall surface of the microchannel portion was generally semicircular in a section perpendicular to the fluid flow direction.

(Catalyst Applying Process)
An aluminum line having a diameter of 400 µm was prepared as a metal base body. This aluminum line was connected to an anode of external electrodes, immersed in an anode oxidizing solution (4% oxalic acid solution) so as to confront a cathode thereof, and energized under the following condition, thereby forming an aluminum oxide thin film on the surface. The thickness of the aluminum oxide thin film was measured by an ellipsometer, and the result was about 30 µm.
  (Anodic Oxidation Condition)
  Bath Temperature: 25° C.
  Voltage: 25V (DC)

Then, the aluminum line formed with the aluminum oxide thin film was immersed (2 hours) in a catalyst precursor solution having the following composition, taken out, and dried at 350° C. for 6 hours, thereby applying a catalyst (Cu/ZnO) on the aluminum oxide thin film. Thereafter, bending was applied to form it into a shape corresponding to the meandering shape of the microchannel portion formed on the foregoing Al substrate to thereby obtain a catalyst carrying member having an overall length of 200 mm.

| (Composition of Catalyst Precursor Solution) | |
| --- | --- |
| Cu | 0.5 mol/L |
| Zn | 0.5 mol/L |

(Joining Process)
The foregoing catalyst carrying member was disposed in the microchannel portion of the Al substrate formed with the microchannel portion as described above. Then, an Al plate having a thickness of 100 µm was prepared as a substrate (cover member). This Al plate (cover member) was brazed, under the following condition, to the Al substrate with the catalyst carrying member disposed therein, so as to cover the microchannel portion, thereby producing a joined body. This Al plate (cover member) was provided with two opening portions (a feed material inlet and a product recovery port: size of each opening portion 0.6 mm×0.6 mm), and positioning was carried out so that the opening portions coincided with both end portions of a flow path of the microchannel portion formed on the Al substrate. Consequently, the flow path connecting between the feed material inlet and the product recovery port was formed within the joined body.
  (Brazing Condition)
  Brazing Material: AA4004 (produced by Furukawa-Sky Aluminum Corp.)
  Atmosphere: Under Vacuum
  Brazing Temperature: 600° C.
  Joining Time: 3 Minutes Then, like in Example 1, an insulating layer, a heater, electrodes, and a heater protective layer were formed on the Al substrate formed with the microchannel portion.

Consequently, a microreactor of the present invention was obtained.

Example 3

Channel Portion Forming Process

Like in Example 1, a pair of Al substrates each having a microchannel portion were produced.

(Catalyst Applying Process)
A SUS304 line having a diameter of 400 µm was prepared as a metal base body. Then, Aluminasol 520 (produced by Nissan Chemical Industries, Ltd.) was used to prepare an alumina sol suspension with a viscosity of 15 to 20 mPa·s. Then, the foregoing SUS304 line was immersed (5 minutes)

in this alumina sol suspension and, after taking it out, drying was carried out at 450° C. for 30 minutes, thereby applying a boehmite treatment thereto. Consequently, there was formed an aluminum oxide thin film covering the SUS304 line. The thickness of the formed aluminum oxide thin film was measured by an ellipsometer, and the result was about 1 μm.

Then, like in Example 1, a catalyst was applied on the aluminum oxide thin film formed on the SUS304 line. Thereafter, bending was applied to form it into a shape corresponding to the meandering shapes of the microchannel portions formed on the Al substrates to thereby obtain a catalyst carrying member having an overall length of 200 mm.

(Joining Process)

Then, like in Example 1, the Al substrates were joined together by brazing to produce a joined body. Thereby, there was obtained the joined body in which a flow path having a feed material inlet and a product recovery port at one end surface of the joined body was formed and the catalyst carrying member was disposed in this flow path.

Then, like in Example 1, an insulating layer, a heater, electrodes, and a heater protective layer were formed on the Al substrate formed with the microchannel portion.

Consequently, a microreactor of the present invention was obtained.

Example 4

Channel Portion Forming Process

First, like in Example 1, a pair of Al substrates each having a microchannel portion were produced.

Then, by the use of a reamer, through holes (opening diameter about 500 μm) penetrating to the opposite side were formed near both end portions of the microchannel portion of one of the Al substrates.

(Catalyst Applying Process)

A nichrome (Ni—Cr alloy) line having a diameter of 400 μm was prepared as a metal base body. Then, this nichrome line was immersed in molten aluminum and then taken out, thereby forming an aluminum film (thickness 100 μm) so as to cover the nichrome line. The aluminum film thus formed on the nichrome line was connected to an anode of external electrodes, immersed in an anode oxidizing solution (4% oxalic acid solution) so as to confront a cathode thereof, and energized under the following condition, thereby forming an aluminum oxide thin film on the surface. The thickness of the aluminum oxide thin film was measured by an ellipsometer, and the result was about 30 μm.

(Anodic Oxidation Condition)

Bath Temperature: 25° C.

Voltage: 25V (DC)

Then, like in Example 1, a catalyst was applied on the aluminum oxide thin film. Thereafter, bending was applied to form it into a shape corresponding to the meandering shapes of the microchannel portions formed on the Al substrates to thereby obtain a catalyst carrying member having an overall length of 200 mm. Further, by the use of 5% sodium hydroxide aqueous solution, the aluminum oxide thin film and the aluminum film were removed near both end portions of the catalyst carrying member to thereby expose the nichrome line.

(Joining Process)

Then, the foregoing catalyst carrying member was placed in the microchannel portion of the Al substrate formed with the through holes. In this event, positioning was performed so that the through holes and portions where the nichrome line of the catalyst carrying member was exposed coincided with each other. Then, an Ag paste was filled in the through holes so as to be connected to the exposure portions of the nichrome line of the catalyst carrying member and to form electrodes on the opposite side of the Al substrate.

Thereafter, the foregoing pair of Al substrates were joined together by brazing, under the same condition as in Example 1, such that the mutual microchannel portions confronted each other, thereby producing a joined body. By this joining, there was obtained the joined body in which a flow path having a feed material inlet and a product recovery port at one end surface of the joined body was formed and the catalyst carrying member including therein the nichrome line was disposed in this flow path.

Consequently, a microreactor of the present invention was obtained.

INDUSTRIAL APPLICABILITY

The present invention can be utilized for achieving desired reactions by the use of a supported catalyst, for example, for producing hydrogen by steam reforming hydrocarbon-based fuel.

The invention claimed is:

1. A microreactor for producing hydrogen by reforming a feed material, comprising:
   a joined body including a first substrate and a second substrate that are joined together;
   a flow path formed by a microchannel portion formed on a joining surface of at least one of said first or second substrates; and
   a catalyst carrying member disposed in said flow path and including a reforming catalyst,
   wherein said reforming catalyst is supported independent of wall surfaces of said microchannel portion that define said flow path so as to be suspended in the microchannel portion, free of contact with the wall surfaces,
   wherein the catalyst carrying member is wire shaped, and
   wherein said wall surfaces of said microchannel portion that define said flow path are free of any film or catalyst.

2. A microreactor according to claim 1, wherein said catalyst carrying member comprises a metal base body, a metal oxide film covering said metal base body, and said reforming catalyst supported on said metal oxide film.

3. A microreactor according to claim 2, wherein said metal oxide film is formed by anodic oxidation of said metal base body.

4. A microreactor according to claim 2, wherein said metal oxide film is formed by a boehmite treatment.

5. A microreactor according to claim 2, wherein said metal base body is circular in section.

6. A microreactor according to claim 1, wherein at least one of said first or second substrates of said joined body is provided with a heater.

7. A microreactor according to claim 6, wherein said heater is provided on said substrate via an insulating layer.

8. A microreactor according to claim 1, wherein said catalyst carrying member comprises an electric heater, a metal oxide film covering said electric heater, and said reforming catalyst supported on said metal oxide film.

9. A microreactor according to claim 8, wherein said metal oxide film is formed by a boehmite treatment.

10. A microreactor according to claim 1, wherein said catalyst carrying member comprises an electric heater, a metal film covering said electric heater, a metal oxide film covering said metal film, and said reforming catalyst supported on said metal oxide film.

11. A microreactor according to claim 10, wherein said metal oxide film is formed by anodic oxidation of said metal film.

12. A microreactor according to claim 10, wherein said metal oxide film is formed by a boehmite treatment.

13. A microreactor for producing hydrogen by reforming a feed material, comprising:
- a joined body including a first substrate and a second substrate that are joined together;
- a flow path formed by a microchannel portion formed on a joining surface of at least one of said first or second substrates;
- a catalyst carrying member disposed in said flow path and including a reforming catalyst, said reforming catalyst is supported independent of wall surfaces of said microchannel portion that define said flow path so as to be suspended in the microchannel portion, free of contact with the wall surfaces;

wherein said catalyst carrying member comprises a metal base body, a metal oxide film covering said metal base body, and said catalyst supported on said metal oxide film, wherein said metal body includes a wavelike plate shape in section, and wherein said wall surfaces of said microchannel portion that define said flow path are free from any film or catalyst.

* * * * *